(12) United States Patent
Takata et al.

(10) Patent No.: US 11,026,185 B2
(45) Date of Patent: *Jun. 1, 2021

(54) COMMUNICATION APPARATUS AND COMMUNICATION METHOD

(71) Applicant: Panasonic Intellectual Property Management Co., Ltd., Osaka (JP)

(72) Inventors: Tomohumi Takata, Ishikawa (JP); Yoshio Urabe, Nara (JP); Takashi Iwai, Ishikawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,549

(22) Filed: Jan. 8, 2020

(65) Prior Publication Data

US 2020/0163027 A1 May 21, 2020

Related U.S. Application Data

(63) Continuation of application No. 16/003,989, filed on Jun. 8, 2018, now Pat. No. 10,568,044, which is a (Continued)

(30) Foreign Application Priority Data

Jan. 7, 2016 (JP) .............................. JP2016-001954
Jul. 11, 2016 (JP) .............................. JP2016-136798

(51) Int. Cl.
*H04W 52/18* (2009.01)
*H04W 52/14* (2009.01)
(Continued)

(52) U.S. Cl.
CPC ......... *H04W 52/18* (2013.01); *H04W 52/146* (2013.01); *H04W 52/247* (2013.01);
(Continued)

(58) Field of Classification Search
None
See application file for complete search history.

(56) References Cited

U.S. PATENT DOCUMENTS

| 2014/0153534 A1 | 6/2014 | Kim et al. | |
| 2015/0110046 A1* | 4/2015 | Merlin | H04B 7/0626 370/329 |
| 2016/0119881 A1* | 4/2016 | Merlin | H04W 52/242 370/328 |

FOREIGN PATENT DOCUMENTS

JP 2015-139101 A 7/2015

OTHER PUBLICATIONS

3GPP TSG RAN WG1 Meeting #51bis, R1-080159, "L1 eNB measurements on PRACH resources", Jan. 8, 2008.
(Continued)

*Primary Examiner* — Fayyaz Alam
(74) *Attorney, Agent, or Firm* — Seed IP Law Group LLP

(57) ABSTRACT

A communication apparatus includes: signal generation circuitry which, in operation, generates a control signal including a target reception power value regarding a target value of a reception power for the communication apparatus to receive an uplink (UL) response frame transmitted by each of one or more terminal stations, the control signal being a trigger frame that solicits transmission of the UL response frame from each of the one or more terminal stations; and transmission circuitry which, in operation, transmits the generated signal.

20 Claims, 26 Drawing Sheets

Related U.S. Application Data continuation of application No. PCT/JP2016/004978, filed on Nov. 28, 2016.

(51) Int. Cl.

| | | |
|---|---|---|
| *H04W 52/24* | (2009.01) | |
| *H04W 52/58* | (2009.01) | |
| *H04W 52/32* | (2009.01) | |
| *H04W 52/36* | (2009.01) | |
| *H04B 7/0452* | (2017.01) | |
| *H04W 74/08* | (2009.01) | |

(52) U.S. Cl.
CPC ......... *H04W 52/325* (2013.01); *H04W 52/58* (2013.01); *H04B 7/0452* (2013.01); *H04W 52/362* (2013.01); *H04W 74/08* (2013.01)

(56) References Cited

OTHER PUBLICATIONS

Extended European Search Report, dated Oct. 24, 2018, for the related European Patent Application No. 16883532.0, 8 pages.

International Search Report of PCT application No. PCT/JP2016/004978 dated Feb. 14, 2017.

IEEE 802.11-15/0132r12, "Specification Framework for TGax", Dec. 1, 2015.

IEEE 802.11-14/1446r0, "Analysis of frequency and power requirements for UL-OFDMA", Nov. 3, 2014.

IEEE Computer Society, "Part11: Wireless LAN Medium Access Control (MAC) and Physical Layer (PHY) Specifications Amendment5: Spectrum and transmit power management extensions in the 5 GHz band in Europe", IEEE Std 802.11h(TM)—2003, Oct. 14, 2003.

ETSI TS 136 331 V12.7.0 (Oct. 2015), LTE; Evolved Universal Terrestrial Radio Access (EUTRA); Radio Resource Control (RRC); Protocol specification (3GPP TS 36.331 version 12.7.0 Release 12), Oct. 16, 2015.

IEEE Computer Society, "Part11: Wireless LAN Medium Access Control (MAC) and Physical Layer (PHY) Specifications", IEEE Std 802.11(TM)—2012, Mar. 29, 2012.

IEEE 802.11-15/0821r2, "HE-SIG-B Structure", Jul. 15, 2015.

Communication pursuant to Article 94(3) EPC dated Sep. 30, 2020 for the related European Patent Application No. 16883532.0, 7 pages.

* cited by examiner

FIG. 8A

| PERFORMANCE OF A/D CONVERSION | ALLOWABLE POWER DIFFERENCE |
|---|---|
| HIGH (LARGE BIT NUMBER) | LARGE (15 dB) |
| LOW (SMALL BIT NUMBER) | SMALL (5 dB) |

FIG. 8B

| NUMBER OF MULTIPLEX TERMINAL | ALLOWABLE POWER DIFFERENCE |
|---|---|
| LARGE | LARGE (15 dB) |
| SMALL | SMALL (5 dB) |

FIG. 9A
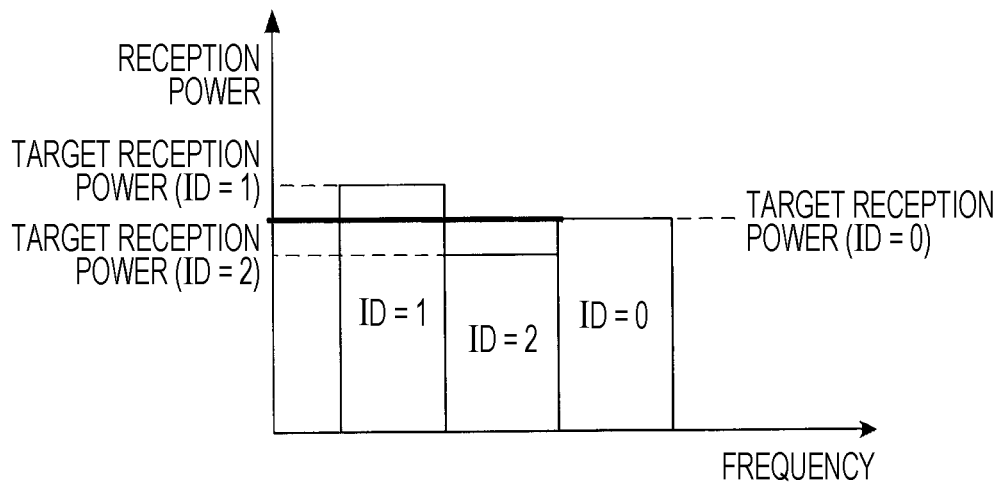
FIG. 9B
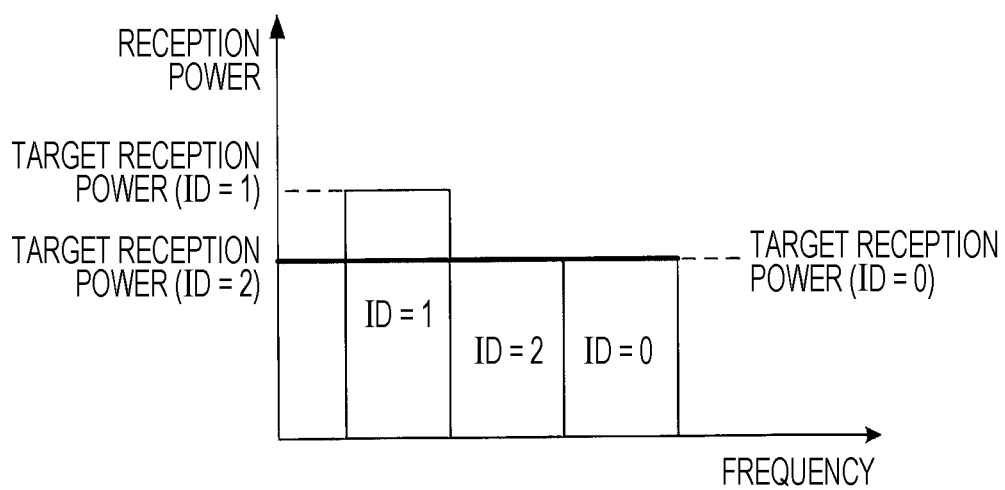
FIG. 9C
| PURPOSE | TARGET RECEPTION POWER |
|---|---|
| PREFERENTIALLY RECEIVE SIGNAL FROM CELL EDGE TERMINAL | LOW (-75 dBm) |
| PREFERENTIALLY RECEIVE SIGNAL FROM TERMINAL NEAR CELL | HIGH (-65 dBm) |

FIG. 12

| TYPE OF RESPONSE SIGNAL | DEGREE OF IMPORTANCE | TARGET RECEPTION POWER |
|---|---|---|
| TYPE A: DATA | MIDDLE | MIDDLE |
| TYPE B: CONTROL INFORMATION | HIGH | HIGH |
| TYPE C: MANAGEMENT INFORMATION | LOW | LOW |

FIG. 13

| ALLOCATION METHOD | TARGET RECEPTION POWER |
|---|---|
| SPECIFIC ALLOCATION | HIGH |
| RANDOM ACCESS ALLOCATION | LOW |

FIG. 15

| ID | OFFSET |
|---|---|
| 00 | -5 dB |
| 01 | 0 dB |
| 10 | 5 dB |
| 11 | 10 dB |

FIG. 23

| TYPE OF RESPONSE SIGNAL | DEGREE OF IMPORTANCE | WHETHER TO STOP TRANSMISSION |
|---|---|---|
| TYPE A: DATA | MIDDLE | DO NOT STOP |
| TYPE B: CONTROL INFORMATION | HIGH | DO NOT STOP |
| TYPE C: MANAGEMENT INFORMATION | LOW | STOP |

COMMUNICATION APPARATUS AND COMMUNICATION METHOD

BACKGROUND

1. Technical Field

The present disclosure relates to a communication apparatus and a communication method to perform uplink transmission power control.

2. Description of the Related Art

In Task Group ax of the Institute of Electrical and Electronics Engineers (IEEE) 802.11 Working Group, a technical specification of IEEE 802.11ax (hereinafter, 11ax) is being developed as a next standard that would replace 802.11ac. In 11ax, a multi-user transmission method (hereinafter, MU transmission) based on the orthogonal frequency-division multiple access (OFDMA) and the multi user-multi input multi output (MU-MIMO) is expected to be introduced to uplink (UL).

In a UL MU transmission procedure, an access point (also called a base station) transmits a control signal as a trigger for an uplink signal to multiple stations (also called STAs) within the area covered by the access point. Based on the control signal, a station, which transmits the uplink signal, transmits an UL response signal (also called a UL response frame) to the access point. There are two methods for the UL MU transmission procedure: one in which an access point specifically designates a station and allocates a frequency resource (hereinafter, a resource unit (RU)) thereto; and the other in which a station selects the RU by a random access (RA). A trigger frame (TF) is a control signal by which the access point specifically designates a station and indicates a corresponding resource, and a trigger frame-random (TF-R) is a control signal by which the access point indicates at least one random access resource.

The TF-R includes allocation information for a station that secures the resource by the random access (hereinafter, random access allocation information) and allocation information for a station specifically designated for the resource allocation (hereinafter, specific allocation information). A station that transmits the UL response signal by the random access decodes RU information for the random access from the TF-R, selects one RU randomly from multiple random access RUs, and transmits the UL response signal using the selected RU (e.g., see IEEE 802.11-15/0132R12 "SPECIFICATION FRAMEWORK FOR TGAX").

SUMMARY

However, in the above-described MU transmission with the random access instructed by the random access control signal (TF-R), it is difficult for the access point side to determine which station secures the resource by the random access. Thus, the access point cannot set appropriate transmission power of the station that transmits the UL response signal by the random access. This leads a problem that a reception power difference between the stations in the access point increases and a reception signal in the access point does not fall within the dynamic range of A/D conversion, or a problem that the Signal to Interference plus Noise Ratio (SINR) decreases due to interference between the stations.

One non-limiting and exemplary embodiment provides a communication method and a communication apparatus that can solve carrier interference and a problem of the dynamic range of A/D conversion by efficiently performing transmission power control in a UL response signal transmitted through MU transmission by the random access and reducing a reception power difference between stations in an access point.

In one general aspect, the techniques disclosed here feature a communication apparatus according to an aspect of the present disclosure includes: signal generation circuitry which, in operation, generates a control signal including a target reception power value regarding a target value of a reception power for the communication apparatus to receive an uplink (UL) response frame transmitted by each of one or more terminal stations, the control signal being a trigger frame that solicits transmission of the UL response frame from each of the one or more terminal stations; and transmission circuitry which, in operation, transmits the generated signal.

It should be noted that such inclusive or specific aspects may be implemented as a system, a device, a method, an integrated circuit, a computer program, or a storage medium, or may be implemented as any selective combination of a system, a device, a method, an integrated circuit, a computer program, and a storage medium.

According to an aspect of the present disclosure, the reception power difference between the stations in the access point can be reduced in the UL response signal transmitted through the MU transmission by the random access, and this can reduce the interference (MU interference) between the station in the MU transmission and can make a reception signal fall within the dynamic range of A/D conversion.

Further advantages and effects in an aspect of the present disclosure become apparent from the description and the drawings. Those advantages and/or effects are provided in accordance with the features illustrated in some embodiments as well as the description and the drawings; however, not all of the advantages and the effects are necessarily provided to obtain one or more of the same features.

BRIEF DESCRIPTION OF THE DRAWINGS

FIG. 8A is a diagram that illustrates an example of an allowable power difference depending on performance of A/D conversion according to the transmission power control information and field setting method 1 of Embodiment 1;

FIG. 8B is a diagram that illustrates an example of an allowable power difference depending on the number of multiplex stations according to the transmission power control information and field setting method 1 of Embodiment 1;

FIG. 9A is a diagram that illustrates an example of a target reception power determining method according to a target reception power setting method 1 (random access allocation) in the transmission power control information and field setting method 1 of Embodiment 1;

FIG. 9B is a diagram that illustrates an example of a target reception power determining method according to a target reception power setting method 2 (random access allocation) in the transmission power control information and field setting method 1 of Embodiment 1;

FIG. 9C is a diagram that illustrates an example of purposes and target reception power according to a target reception power setting method 4 (random access allocation) in the transmission power control information and field setting method 1 of Embodiment 1;

FIG. 12 is a diagram that illustrates an example of a target reception power value of each type of a response signal according to a transmission power control information and field setting method 3 of Embodiment 1;

FIG. 13 is a diagram that illustrates an example of a target reception power value for each allocation method according to a transmission power control information and field setting method 4 of Embodiment 1;

FIG. 15 is a diagram that illustrates an example of a pattern of a target reception power offset according to the transmission power control information and field setting method 5 of Embodiment 1;

FIG. 23 is a diagram that illustrates an example that transmission is stopped or not depending on a type of a response signal according to a determining method 6 of Embodiment 2;

Figure 1:
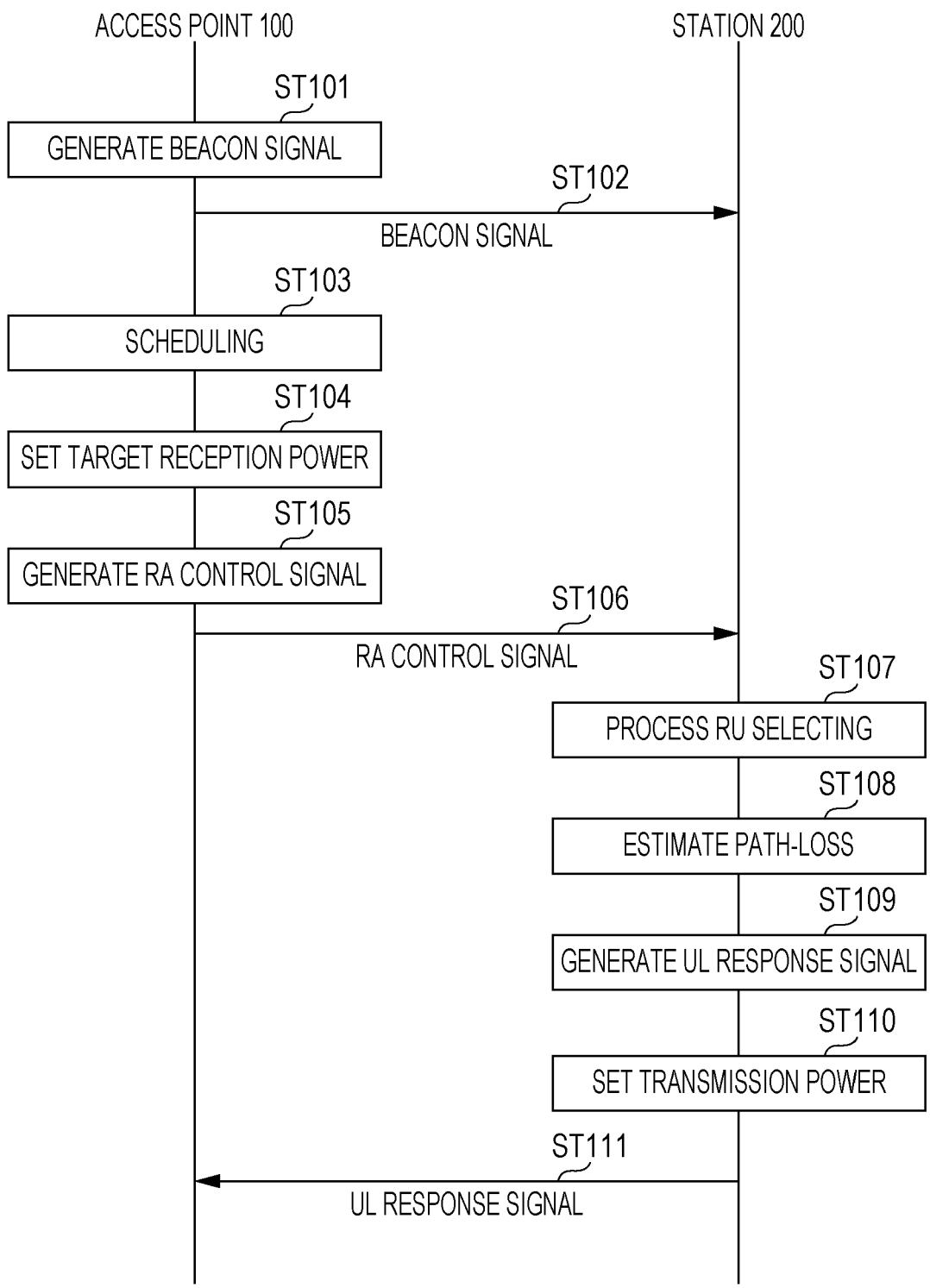
FIG. 1 is a flowchart that illustrates operations of an access point and a station according to Embodiment 1.

DETAILED DESCRIPTION (Underlying Knowledge Forming Basis of the Present Disclosure)

Each of the TF and the TF-R includes Common information field (also called Common field and hereinafter called a "common field") for notifying a station to which an MU transmission resource is allocated of common control information and User information field (also called an STA-specific field or an RU-specific field, and hereinafter called a "station-specific field") for notifying every station or every RU of specific control information. The common field includes Trigger type for notifying of a type of TF, and so on. Meanwhile, the station-specific field includes information for identifying a station (e.g., Association ID (AID)), Modulation and Coding Scheme (MCS), and so on (e.g., see IEEE 802.11-15/0132R12 "SPECIFICATION FRAMEWORK FOR TGAX").

In addition, multiple TFs and TF-Rs can be successively transmitted in a transmission opportunity (TXOP) (also called multiple trigger frame in a TXOP). Whether the successive transmission of the TFs and the TF-Rs occurs can be indicated in a cascade field (also called cascaded field) in each of the TFs and the TF-Rs (e.g., see IEEE 802.11-15/0132R12 "SPECIFICATION FRAMEWORK FOR TGAX").

Since the UL MU transmission has carrier interference and the problem of the dynamic range of AD conversion due to a reception power difference between the stations in the access point, the necessity of transmission power control of each station has been discussed (e.g., see IEEE 802.11-14/1446R0 "ANALYSIS OF FREQUENCY AND POWER REQUIREMENTS FOR UL-OFDMA").

However, as for uplink transmission power control, although 802.11h defines a format such as the TPC report/request, there is no definition of a specific controlling method. The TPC report is included in a beacon, a probe response, or an action frame. In the TPC report, notification of transmission power (Equivalent Isotopic Radiation Power (EIRP)) and a link margin are provided. The link margin is control information only for notifying of an excessive quality, and a station receiving the link margin can reduce the transmission power by the link margin (e.g., see IEEE STD 802.11H-2003).

As described above, the link margin in the transmission power control according to 802.11h is only for notifying of the excessive quality, and thus no control for increasing the transmission power can be performed. Hence, the transmission power control according to 802.11h cannot be applied as the transmission power control to solve the above problems in the UL MU transmission.

In addition, in the long term evolution (LTE) random access, notification of a target reception power value common for cells and power ramping are provided using radio resource control (RRC) signaling, and the station performs control for increasing the transmission power by the power ramping at every retransmission based on the initial target reception power. The target reception power can be semi-statically changed at intervals of at least 640 ms (e.g., see 3GPP TS 36.331).

As described above, since the cycle for changing the target reception power value is long in the LTE transmission power controlling method, the target reception power value cannot be changed at every scheduling depending on a combination of the stations to which the resources are allocated. That is, when the LTE transmission power control is applied in the UL MU transmission, it is still possible to perform control such as fixing the target reception power value of a station positioned at a cell edge (hereinafter called a cell edge station), but it is impossible to dynamically control the target reception power value to fit that with respective qualities of a station near the access point and the cell edge station far from the access point. Thus, scheduling gain, or gain made by the optimum adaptation modulation performed on every station based on a reception quality of each station in the access point cannot be obtained.

Thus, an object of an aspect of the present disclosure is to efficiently perform the transmission power control in the UL MU transmission. Specifically, the object is to solve the carrier interference and the problem of the dynamic range of A/D conversion by introducing efficient transmission power control to the UL response signal, which is transmitted through the MU transmission by the random access to the resource indicated by the random access control signal, and reducing the reception power difference between the stations in the access point. In addition, the object is to improve the system throughput by dynamically changing the target reception power value at every scheduling depending on the reception qualities of the random access-allocation station and the specific-allocation station and making possible immediate application of the optimum adaptation modulation of every station.

Embodiments of the present disclosure are described below in details with reference to the drawings. Note that, in the embodiments, the same constituents are denoted by the same reference numerals to avoid duplicated description thereof.

Embodiment 1

[Summary of Communication System]

A communication system according to this embodiment includes an access point (communication apparatus) 100 and a station 200. The access point 100 is an access point applicable to 11ax, and the station 200 is a station applicable to 11ax.

FIG. 1 illustrates a sequence of processing in the communication system according to this embodiment.

In FIG. 1, the access point 100 generates a beacon signal (step (hereinafter, represented as "ST") 101).

The beacon signal includes transmission power of the access point 100. Specifically, equivalent isotropic radiated power (hereinafter, EIRP) of the access point 100 is set as the transmission power. In general, the EIRP is broadcast determined based on antenna gain in the maximum radiated direction of a directional antenna. Thus, when the station 200 performs later-described path-loss estimation and transmission power setting based on the EIRP, a difference may occur between actual reception power and target reception power in the access point. In order to solve this problem, total radiated power (hereinafter, TRP) of the access point 100 may be used as the broadcast transmission power. Using the TRP when applying beam forming can reduce the difference in the reception power due to a position of the station 200 and a difference in a direction of the beam. The transmission power may be broadcast to the stations 200 using a management frame such as Probe Response and Association Response, or may be broadcast to the station 200 while being included in the random access control signal.

The access point 100 notifies the station 200 of the reception power the generated beacon signal is wirelessly provided to (ST102).

The access point 100 performs scheduling (frequency allocation, MCS selection) of downlink data (DL data)/UL response signal (ST103). The access point 100 may perform the scheduling using channel state information (CSI), which is provided as feedback from the station 200.

Based on the scheduling result, the access point 100 sets a target reception power value of each station to which the resource is allocated (ST104). A method of setting the target reception power value is described later.

The access point 100 generates a random access (RA) control signal (TF-R) (ST105).

The random access control signal includes at least one piece of random access allocation information and may optionally include specific allocation information. In the specific allocation information, a unique ID for discrimination of the station 200 (STA_ID) is used to clearly indicate the allocation of the RU. That is, each station 200 determines that the RU to which its own ID is allocated as the RU available for transmission of the UL response signal. Meanwhile, in the random access allocation information, a random access ID is used to clearly indicate the allocation of the random access RU. As the random access ID, an ID that is not allocated for the discrimination of a specific station 200 is used. For example, an association ID (AID), which is a unique ID that is allocated during association with a network where the access point 100 belongs (basic service set (BSS), multiple stations 200 under the access point 100), may be used as the STA_ID, and a spare value, which is not generally used as the AID, may be used as the random access ID.

In this embodiment, the access point 100 puts the target reception power value into the random access control signal. The access point 100 provides the notification of the target reception power value using the random access control signal, and thus the target reception power value can be dynamically changed at every scheduling depending on the reception qualities of the random access-allocation station or the specific-allocation station. Thus, the optimum adaptation modulation can be immediately applied to each station 200, and hence the system throughput is improved.

Note that the target reception power value is a power value (target value) as a target of the reception power when the access point 100 receives the UL response signal of each station 200. Each station 200 controls the transmission power so as to make the reception power of the access point 100 fall within a predetermined allowable power difference (±X[dB]) of the target reception power value. The access point 100 notifies the station 200 of the allowable power difference using the management frame such as the beacon, Probe Response, and Association Response. As the allowable power difference is controlled by the management frame, an appropriate value can be set for each basic service set ((BSS), multiple stations under the access point). In addition, the notification of the allowable power difference may be provided using the random access control signal. Even though the control of the allowable power difference at every transmission of the random access control signal increases overhead, in an environment where a state of the station 200 greatly changes, appropriate control following the change can be made. In this case, a range including an upper limit value and a lower limit value specified by the allowable power difference of the target reception power value can also be called an allowable power range.

In addition, the target reception power value may not be necessarily an absolute value of the reception power and may be an offset value from a reference such as the minimum reception quality. Moreover, a magnitude and the notification bit number of the allowable power difference of the target reception power value may be different in the random access allocation and the specific allocation. If collision occurs in the random access, the reception power is significantly increased, and this causes the power difference. Thus, for example, setting the allowable power difference small in the random access allocation can lower the upper limit value of the reception power when collision occurs.

The access point 100 wirelessly notifies the station 200 of the generated random access control signal (ST106).

With reference to the own station information, the station 200 specifies an available RU from the RUs indicated by the notification of the random access control signal provided (broadcast) from the access point 100 (ST107). Specifically, when there is control information including own STA_ID in the station-specific field of the random access control signal, the station 200 determines that this is the specific allocation. On the other hand, when there is control information including no own STA_ID but the random access ID in the station-specific field and further retains a signal to be transmitted by the random access, the station 200 determines that this is the random access allocation and selects an RU according to a predetermined process.

When the RU is secured, the station 200 estimates path-loss based on the transmission power, antenna gain, and the like that are provided as notification by the beacon signal (ST108). The path-loss estimation is expressed in Equation (1).

$$pathLoss = ApTxPower + ApTxAntGain - StaRxPower \quad (1)$$

In Equation (1), pathLoss is the estimated path-loss [dBm], ApTxPower is the transmission power (TRP) [dBm] of the access point 100 provided as notification from the beacon and the like, StaRxPower is the reception power (dBm) in an antenna element of preamble or data in the station 200, and ApTxAntGain is the antenna gain [dB] of the access point 100.

The antenna gain includes beam forming gain. ApTxAntGain may be provided as notification from the access point 100 to the station 200 using the management frame such as the beacon, Probe Response, and Association Response, or, may be calculated based on the number of transmission antennae of the access point 100 in the station 200. The access point 100 preferably provides the notification of ApTxPower and ApTxAntGain using the same frame, and then the station 200 preferably measures the reception power of that frame. In addition, when measuring the reception power of the random access control signal, the station 200 may obtain power of a sub carrier included in the RU for transmitting the UL response signal to convert the obtained power to power for the full band if necessary. This can reduce an error due to the interference and the frequency selectivity. Moreover, since the beam forming gain is different depending on the frame or a part (preamble (legacy or high efficiency (HE), data) in which the reception power is measured, the beam forming gain may be changed depending on the measurement target. Specifically, no beam forming gain may be included when the measurement target is a broadcast frame such as the beacon and the random access control signal, non-HT duplicate PPDU that is backward compatible with the legacy method, and the legacy preamble of a specific address frame, while the beam forming gain may be included when the measurement target is remainder behind the HE preamble of a specific address frame. Taking into consideration the beam forming gain improves the estimation accuracy of the path-loss when measuring the remainder behind the HE preamble. Reception power of a signal that is received immediately before or average reception power is used as the reception power.

Note that, when the station 200 estimates the path-loss based on a signal to which no beam forming is applied (e.g., the random access control signal), ApTxAntGain in Equation (1) may be regarded as the beam forming gain and thus be ignored, and then the following Equation (2) may be used. Even when the station 200 estimates the path-loss based on a signal in which the beam forming is effective, if the transmission power ApTxPower is the EIRP, the beam forming gain is included in ApTxPower, and thus the following Equation (2) may be used.

$$pathLoss = ApTxPower - StaRxPower \quad (2)$$

The station 200 generates the UL response signal to be transmitted through the MU transmission by the random access (e.g., data, a buffer status report, or a DL data request signal) (ST109).

The station 200 sets the transmission power of the UL response signal using the estimated path-loss and the target reception power included in the random access control signal (ST110). Note that the path-loss that is estimated based on a downstream signal (the signal from the access point 100 to the station 200) is applied. That is, because of the reversibility between upstream and downstream propagation paths, the path-loss of the downstream signal is applied as the path-loss for calculating the transmission power of the UL response signal (signal from the station 200 to the access point 100). The transmission power of the UL response signal is calculated based on Equation (3), for example. Note that, when the transmission power is greater than the maximum transmission power allowed by the station 200, or when the transmission power is less than the minimum transmission power allowed by the station 200, the station 200 transmits the UL response signal with the maximum transmission power or the minimum transmission power.

$$StaTxPower = \alpha \cdot pathLoss + P_{target} + StaTxAntGain + 10 \log_{10}(RUsize) + C \quad (3)$$

In Equation (3), StaTxPower is the transmission power (dBm) set by the station 200, pathLoss is the path-loss [dBm] estimated based on Equation (1) or Equation (2), $\alpha$ is a correction coefficient multiplied by the path-loss, $P_{target}$ is the target reception power value [dBm] provided as notification by the random access control signal, StaTxAntGain is the antenna gain [dB] of the station 200, and RUsize is a size of the allocated RU. In addition, C is an environment-dependent correction constant, which is set depending on a state of surrounding overlapping BSS (OBSS), for example. Note that $P_{target}$ is the reception power in the antenna element.

The access point 100 may notify the station 200 of the correction coefficient $\alpha$ of the path-loss using the management frame such as the beacon, Probe Response, and Association Response, or, may broadcast the stations 200 of the correction coefficient $\alpha$ of the path-loss while including in the random access control signal. As the correction coefficient $\alpha$ is controlled using the management frame, an appropriate value can be set for each BSS. In addition, as the correction coefficient $\alpha$ is controlled at every transmission of the random access control signal, even though overhead is increased, in an environment where a state of the station greatly changes, appropriate control following the change can be made.

The correction coefficient $\alpha$ is set while, for example, considering the interference in the BSS in the OBSS environment in which multiple BSSs are densely arranged. For example, when the number of the surrounding BSSs is large, the correction coefficient a is set to a small value (e.g., 0.8) to reduce the transmission power of the cell edge station, and thus the interference in the surrounding BSSs is reduced. On the other hand, when the number of the surrounding BSSs is small, the correction coefficient $\alpha$ is set to a large value (e.g., 1.0) to increase the transmission power of the cell edge station, and thus the throughput of the cell edge station is improved.

The station 200 transmits the UL response signal to the access point 100 with the set transmission power (ST111).

The sequence of processing in the communication system according to this embodiment is described above.

Figure 2:
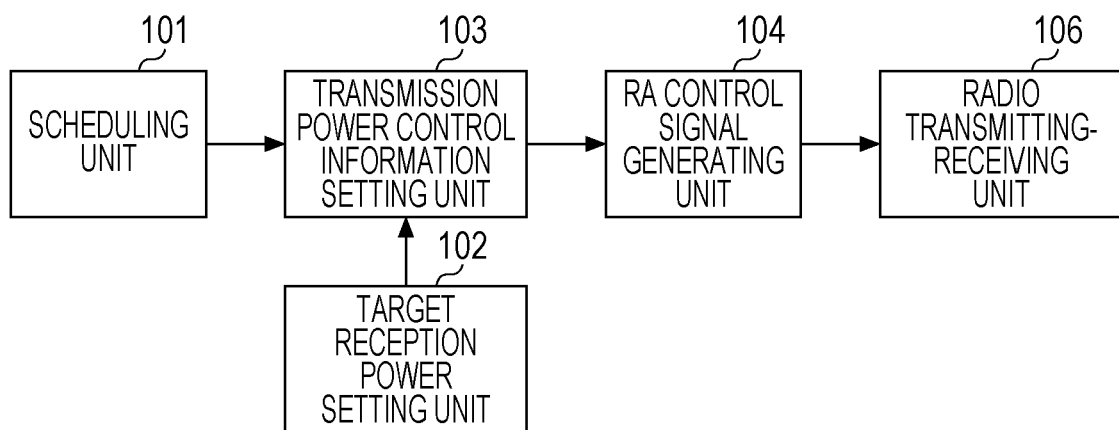
FIG. 2 is a block diagram that illustrates a main configuration of the access point according to Embodiment 1.

FIG. 2 is a block diagram that illustrates a main configuration of the access point 100 according to this embodiment. In the access point 100 illustrated in FIG. 2, a transmission power control information setting unit 103 sets the transmission power control information for each resource based on the target reception power value obtained from a target reception power setting unit 102 and resource allocation information (such as the specific allocation and the random access allocation) obtained from a scheduling unit 101. An RA control signal generating unit 104 generates the random access control signal (TF-R), which includes allocation information indicating at least one transmission frequency resource. The random access control signal includes the target reception power value calculated by the transmission power control information setting unit 103. The radio transmitting-receiving unit 106 transmits the random access control signal.

Figure 3:
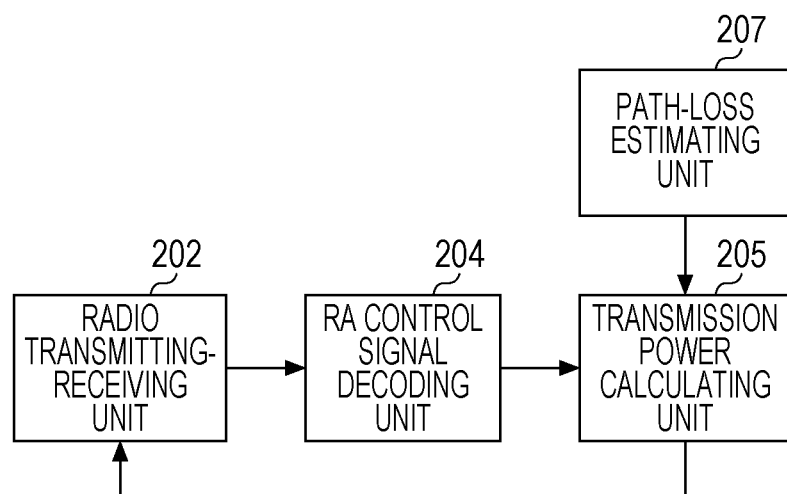
FIG. 3 is a block diagram that illustrates a main configuration of the station according to Embodiment 1.

FIG. 3 is a block diagram that illustrates a main configuration of the station 200 according to this embodiment. A radio transmitting-receiving unit 202 receives the random access control signal (TF-R), which includes the allocation information indicating at least one transmission frequency resource. Here, one of the multiple random access IDs is allocated to each of the one or more transmission frequency resources. An RA control signal decoding unit 204 obtains the target reception power value included in the random access control signal. In a path-loss estimating unit 207, the path-loss is estimated based on the transmission power provided as notification from the access point 100 and the reception power of the reception signal. A transmission power calculating unit 205 sets the transmission power of the response signal using the target reception power value and the path-loss.

[Configuration of Access Point 100]

Figure 4:
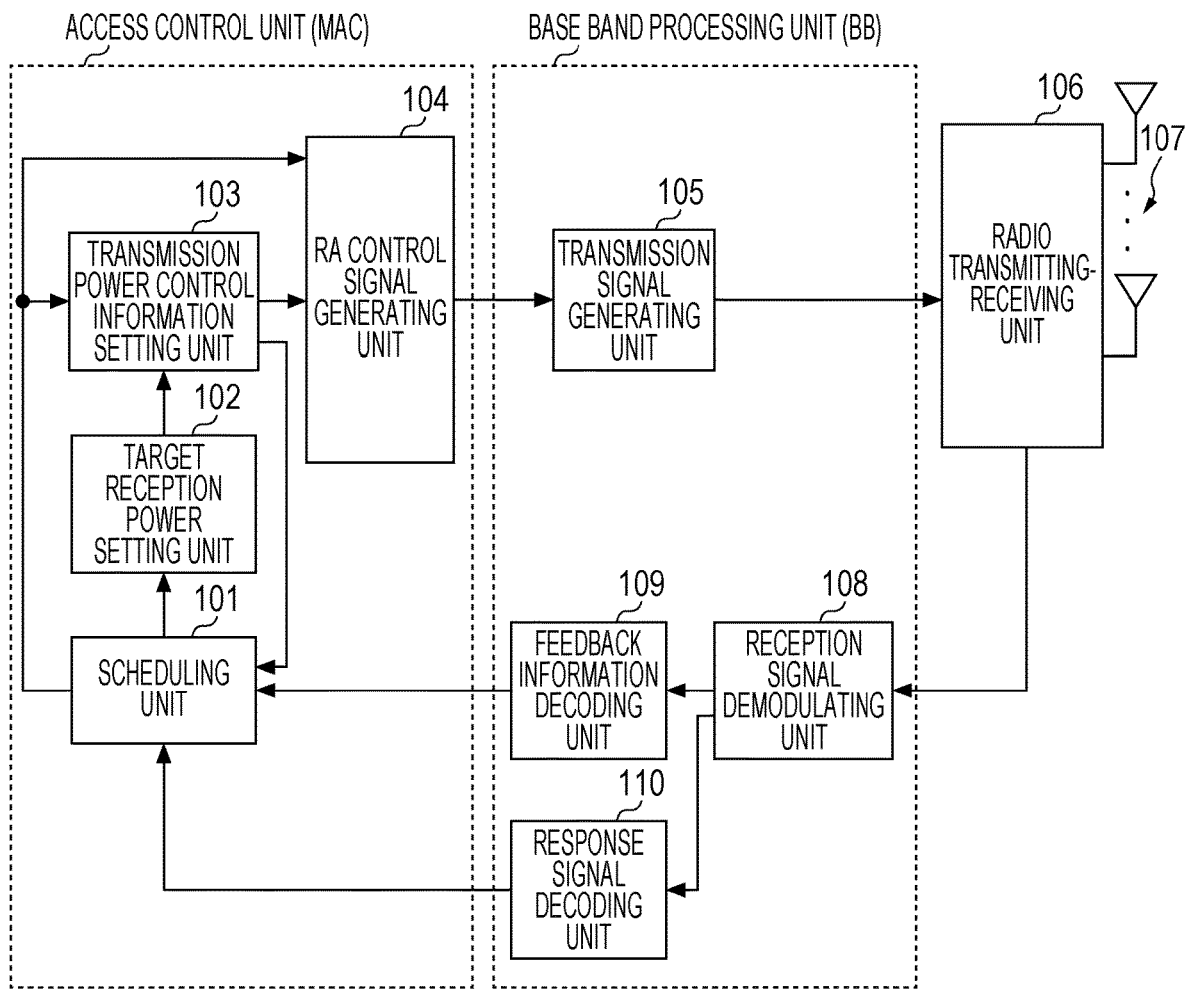
FIG. 4 is a block diagram that illustrates a configuration of the access point according to Embodiment 1.

FIG. 4 is a block diagram that illustrates a configuration of the access point 100 according to this embodiment. In FIG. 4, the access point 100 includes the scheduling unit 101, the target reception power setting unit 102, the transmission power control information setting unit 103, the RA control signal generating unit 104, a transmission signal generating unit 105, the radio transmitting-receiving unit 106, an antenna 107, a reception signal demodulating unit 108, a feedback information decoding unit 109, and a response signal decoding unit 110. Note that the scheduling unit 101, the target reception power setting unit 102, the transmission power control information setting unit 103, and the RA control signal generating unit 104 constitute an access control (media access control (MAC)) unit, and the transmission signal generating unit 105, the reception signal demodulating unit 108, the feedback information decoding unit 109, and the response signal decoding unit 110 constitute a base band (BB) processing unit.

Based on the CSI, the buffer status report, and the like that are provided as feedback from each station 200, the scheduling unit 101 determines the RU allocation and the MCS of each station 200. As for these stations 200, since the access point 100 designates the stations 200 to which the resources are allocated, they are the station of the specific allocation. On the other hand, when the resources are needed to be allocated to the stations 200 by the random access, the scheduling unit 101 secures the random access RUs.

The target reception power setting unit 102 sets the target reception power value of each RU based on a state of the RU allocation of the scheduling unit 101. The target reception power setting unit 102 sets at least one target reception power value as the UL transmission power control information for controlling upstream transmission power of each of the multiple stations 200. Details of a method of setting the target reception power value by the target reception power setting unit 102 are described later.

Based on the target reception power value determined by the target reception power setting unit 102 and the resource allocation information indicating the scheduling result determined by the scheduling unit 101, the transmission power control information setting unit 103 generates the transmission power control information for each RU. Details of the control information set by the transmission power control information setting unit 103 are described later. Note that the scheduling unit 101 may start over the scheduling by, for example, reselecting the MCS, based on the transmission power control information calculated by the transmission power control information setting unit 103.

The RA control signal generating unit 104 generates the random access control signal for requesting the station 200 to transmit the UL response signal. The random access control signal includes the Trigger type, which provides notification of a type of the control signal (common field), the station identification information (station-specific field), the MCS (station-specific field), and the like. For the station identification information, a unique ID for identifying the station 200 (STA_ID) is set for the specific allocation, while the random access ID is set for the random access allocation. In addition, the random access control signal includes the transmission power control information set by the transmission power control information setting unit 103. Moreover, the random access control signal includes at least one target reception power value. Details of the set transmission power control information and the field (common field or station-specific field) are described later.

The transmission signal generating unit 105 performs encode and modulation processing on the random access control signal inputted from the RA control signal generating unit 104. In addition, the transmission signal generating unit 105 performs the encode and modulation processing on the information indicating the transmission power of the access point 100 and the information indicating transmission antenna gain of the access point 100. The transmission signal generating unit 105 then applies to the modulated signal the control signal (also called the preamble) such as a pilot signal and a channel estimation signal used for frequency synchronization and timing synchronization at the receiver side (station 200), generates a radio frame (transmission signal), and outputs that to the radio transmitting-receiving unit 106.

The radio transmitting-receiving unit 106 performs predetermined radio transmitting processing such as D/A conversion on the signal inputted from the transmission signal generating unit 105 and up-conversion on the carrier frequency, and then transmits the radio transmission processed signal via the antenna 107.

When receiving the UL response signal (a signal responding the random access control signal transmitted by the access point 100) and the feedback information from the station 200, the access point 100 operates as below.

The radio signal received via the antenna 107 is inputted to the radio transmitting-receiving unit 106. The radio transmitting-receiving unit 106 performs predetermined radio receiving processing such as down-conversion of the carrier frequency on the radio signal and then outputs the radio receiving processed signal to the reception signal demodulating unit 108.

The reception signal demodulating unit 108 performs autocorrelation processing and the like on the signal inputted from the radio transmitting-receiving unit 106 to extract the received radio frame and then outputs that to the feedback information decoding unit 109 and the response signal decoding unit 110.

The feedback information decoding unit 109 demodulates and decodes the feedback such as the CSI and the path-loss provided from the station 200 in the radio frame inputted from the reception signal demodulating unit 108 and then outputs that to the scheduling unit 101.

The response signal decoding unit 110 demodulates and decodes the UL response signal included in any one of the RUs indicated by the random access control signal in the radio frame inputted from the reception signal demodulating unit 108. The response signal decoding unit 110 outputs the reception result to the scheduling unit 101. Based on the reception result, the scheduling unit 101 performs retransmission control and the like.

[Configuration of Station 200]

Figure 5:
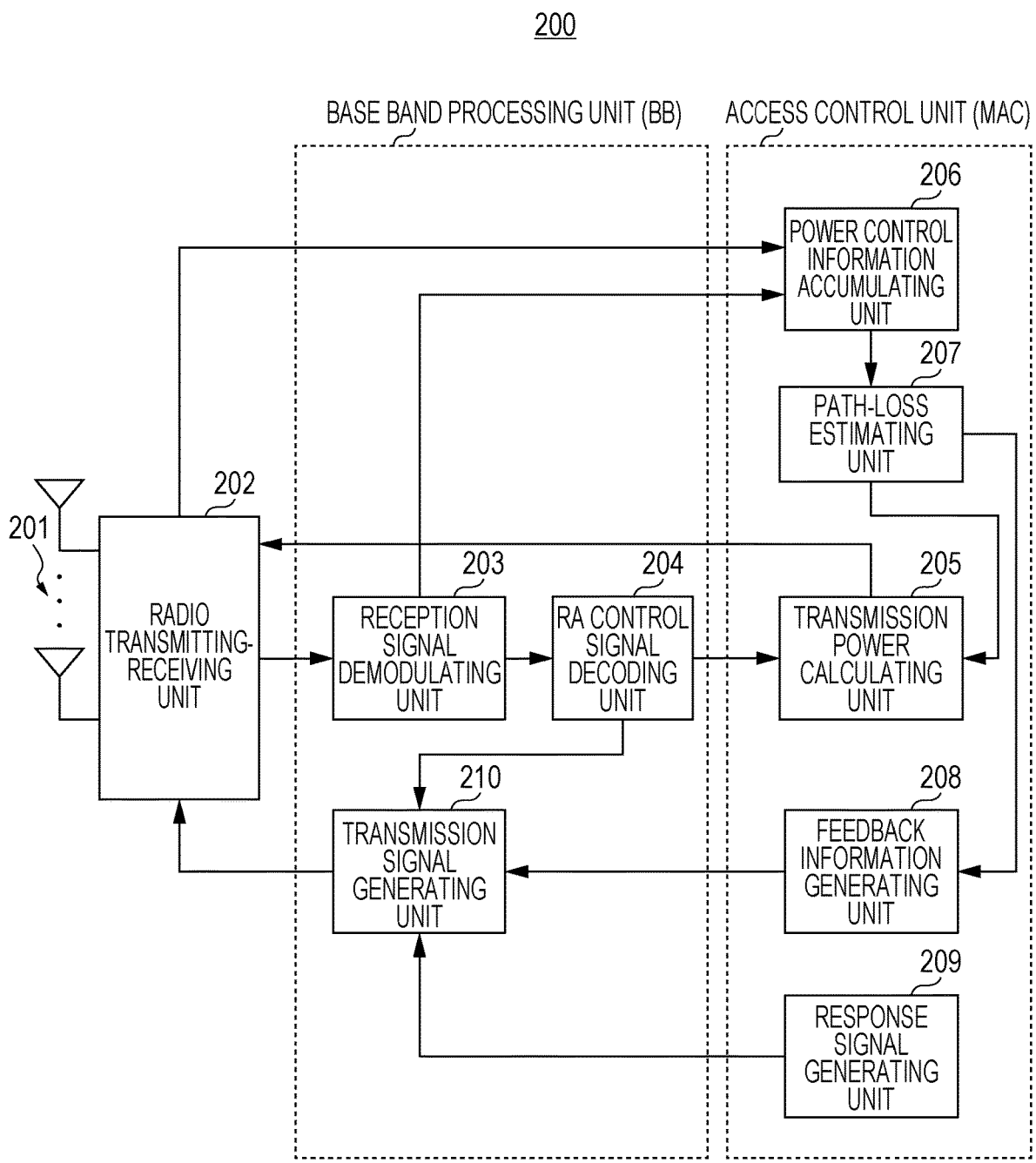
FIG. 5 is a block diagram that illustrates a configuration of the station according to Embodiment 1.

FIG. 5 is a block diagram that illustrates a configuration of the station 200 according to this embodiment. In FIG. 5, the station 200 includes an antenna 201, the radio transmitting-receiving unit 202, a reception signal demodulating unit 203, the RA control signal decoding unit 204, the transmission power calculating unit 205, a power control information accumulating unit 206, the path-loss estimating unit 207, a feedback information generating unit 208, a response signal generating unit 209, and a transmission signal generating unit 210. In addition, the transmission power calculating unit 205, the power control information accumulating unit 206, the path-loss estimating unit 207, the feedback information generating unit 208, and the response signal generating unit 209 constitute an access control unit (MAC), and the reception signal demodulating unit 203, the RA control signal decoding unit 204, and the transmission signal generating unit 210 constitute a base band (BB) processing unit.

The radio transmitting-receiving unit 202 receives the signal transmitted from the access point 100 (FIG. 4) via the antenna 201, performs predetermined radio receiving processing such as down-conversion and A/D conversion on the reception signal, outputs the radio receiving processed signal to the reception signal demodulating unit 203, and then outputs the information indicating the reception power to the power control information accumulating unit 206. In addition, the radio transmitting-receiving unit 202 performs predetermined radio transmitting processing such as D/A conversion and up-conversion of the carrier frequency on the signal inputted from the later-described transmission signal generating unit 210 and outputs the radio receiving processed signal via the antenna 201.

The reception signal demodulating unit 203 performs autocorrelation processing and the like on the signal inputted from the radio transmitting-receiving unit 202 to extract the received radio frame and then outputs that to the RA control signal decoding unit 204. In addition, the reception signal demodulating unit 203 outputs the information indicating the transmission power and the transmission antenna gain of the access point 100 included in the extracted radio frame to the power control information accumulating unit 206.

The RA control signal decoding unit 204 demodulates and decodes the random access control signal included in the transmission RU of the random access control signal in the radio frame inputted from the reception signal demodulating unit 203, outputs the transmission power control information to the transmission power calculating unit 205, and outputs the information such as the MCS that is required for generating the transmission signal, to the transmission signal generating unit 210.

The power control information accumulating unit 206 stores information indicating the reception power inputted from the radio transmitting-receiving unit 202 and information indicating the transmission power and the transmission antenna gain of the access point 100 inputted from the reception signal demodulating unit 203.

Based on the transmission power (and also the transmission antenna gain in Equation (1)) of the access point 100 inputted from the power control information accumulating unit 206 and the measured reception power, the path-loss estimating unit 207 calculates the path-loss using Equation (1) or Equation (2), and outputs that to the transmission power calculating unit 205 and the feedback information generating unit 208.

Based on the target reception power value included in the transmission power control information inputted from the RA control signal decoding unit 204 and the path-loss inputted from the path-loss estimating unit 207, the transmission power calculating unit 205, for example, calculates the transmission power of the UL response signal using Equation (3).

The feedback information generating unit 208 generates, if necessary, estimated channel state information (CSI, RSSI) and feedback information including, for example, the path-loss inputted from the path-loss estimating unit 207 and outputs that to the transmission signal generating unit 210. The timing for providing the path-loss as feedback is described later.

The response signal generating unit 209 generates a station ID of the station 200 and the UL response signal including the transmission information on the station 200 (such as the data, the buffer status report, or the DL data request) and outputs them to the transmission signal generating unit 210.

The transmission signal generating unit 210 uses the information such as the MCS inputted from the RA control signal decoding unit 204 to perform encoding and modulating on the UL response signal inputted from the response signal generating unit 209 or the feedback information inputted from the feedback information generating unit 208. The transmission signal generating unit 210 then applies to the modulated signal the control signal (preamble) such as the pilot signal and the channel estimation signal used for the frequency synchronization and the timing synchronization at the receiver side (access point 100), generates the radio frame (transmission signal), and outputs that to the radio transmitting-receiving unit 202.

[Transmission Power Control Information and Field Setting Method]

Next, the transmission power control information in the above-described access point 100 and the field set to the random access control signal are described in detail.

Hereinafter, transmission power control information and field setting methods 1 to 7 are described severally.

<Setting Method 1>

Figure 6:
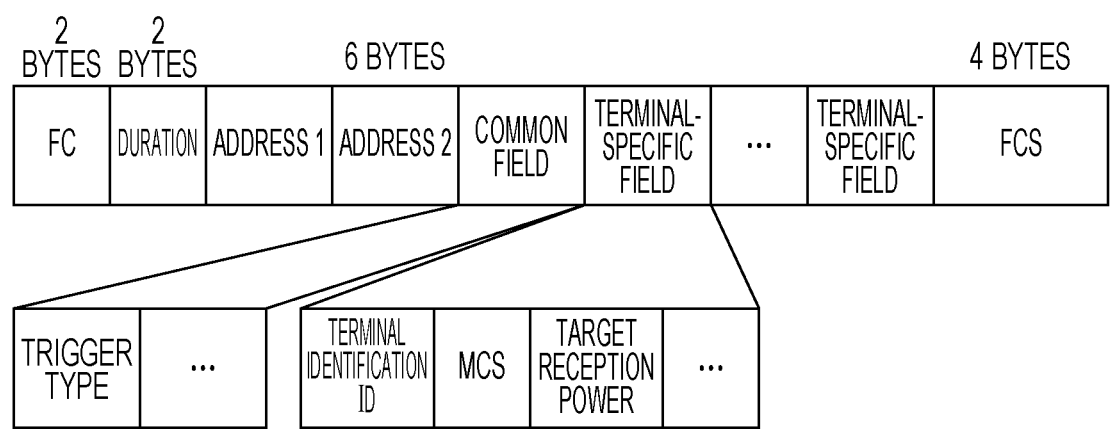
FIG. 6 is a diagram that illustrates an example of a random access control signal according to a transmission power control information and field setting method 1 of Embodiment 1.

In the setting method 1, the access point 100 (RA control signal generating unit 104) arranges the target reception power value in the station-specific field of the random access control signal. FIG. 6 illustrates an example of the random access control signal according to the setting method 1. The Trigger type in FIG. 6 indicates a type of the trigger frame and, for example, the Trigger type is set to indicate that the trigger frame is the random access control signal.

After receiving the random access control signal, the station 200 obtains the target reception power value arranged in the station-specific field to which the STA_ID or the random access ID of the station 200 (own device) is set as station identification ID. Then, based on the path-loss calculated by the path-loss estimating unit 207 and the above-described obtained target reception power value, the station 200, for example, calculates the transmission power of the response signal using Equation (3) and performs the transmission power control on the response signal.

[Target Reception Power Value Setting Method]

Next, a method of setting the target reception power value in the access point 100 when the setting method 1 is applied is described. Note that the target reception power value is a reception power value in the antenna element. Thus, when determining the target reception power value based on the reception power including reception antenna gain, the access point 100 needs to modify the determined target reception power value to a value fromwhich the reception antenna gain is removed and to notify the station 200 of the modified value.

Hereinafter, target reception power value setting methods 1 to 3 in the specific allocation are described severally with reference to FIGS. 7A to 7C.

<Target Reception Power Setting Method 1 (Specific Allocation)>

With reference to the station information and the MCS of each station 200 indicating the resource allocated by the specific allocation, which are determined by the scheduling unit 101, the target reception power setting unit 102 determines the target reception power value based on the difference of the lowest required reception power of each MCS between the resources. Note that the lowest required reception power (minimum sensitivity) of each MCS is defined in the 802.11 specification (e.g., see IEEE STD 802.11-2012 for a case of 11n).

Figure 7A:
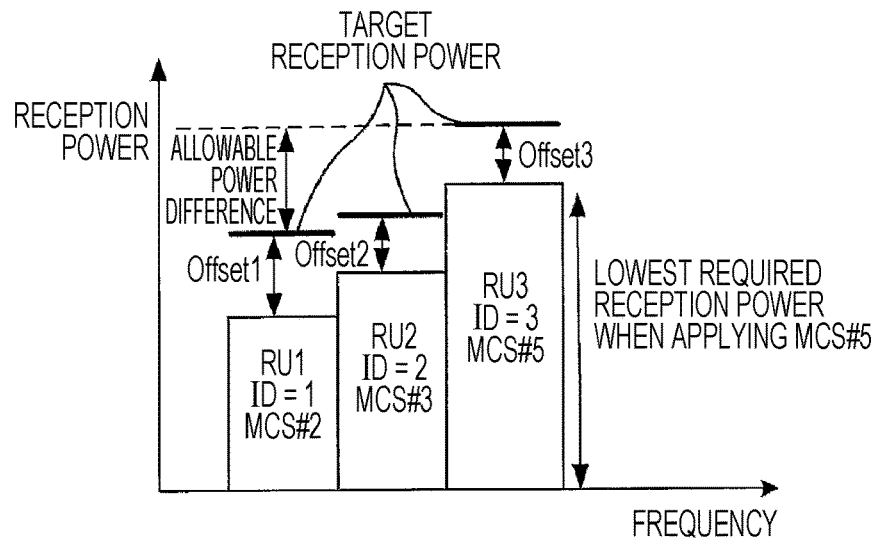
FIG. 7A is a diagram that illustrates an example of a target reception power determining method according to a target reception power setting method 1 (specific allocation) in the transmission power control information and field setting method 1 of Embodiment 1.

FIG. 7A illustrates an example of a method of determining the target reception power according to the target reception power setting method 1 (specific allocation) in the setting method 1. In FIG. 7A, resources (RU=1, 2, 3) are respectively allocated to three stations (ID=1, 2, 3). The MCSs of the respective stations are #2, #3, #5.

The target reception power setting unit 102 adds offsets (offsets 1 to 3) to the lowest required reception power of the MCSs respectively and sets the offsets to allow a difference between the maximum and the minimum of the reception power to fall within the allowable power difference. For example, in FIG. 7A, among the MCSs #2, #3, and #5, the target reception power setting unit 102 sets each offset to allow a difference between the reception power in which the offset 3 is added to the lowest required reception power of the MCS #5, which has the maximum lowest required reception power, and the reception power in which the offset 1 is added to the lowest required reception power of the MCS #2, which has the minimum lowest required reception power, to fall within the allowable power difference.

As described above, based on the lowest required reception power of each MCS, the access point 100 sets the target reception power value for each station 200 to which corresponding resource is allocated; thus, the minimum necessary transmission power can be set, and the power consumption of the station 200 and the interference in another access point 100 can be reduced.

Note that the allowable power difference may be changed depending on the performance of A/D conversion of the access point 100 as illustrated in FIG. 8A. Changing the allowable power difference depending on the performance of A/D conversion of the access point 100 makes it possible to flexibly set the target reception power value with no deterioration of the performance of reception due to the reception power difference of the station 200, and thus the scheduling gain is improved.

In addition, the allowable power difference may be changed depending on the number of multiplex stations of OFDMA/MU-MIMO as illustrated in FIG. 8B. When the number of multiplex stations is small, the reception power difference between the stations is likely to be smaller than that when the number of multiplex stations is large; thus, changing the allowable power difference depending on the number of multiplex stations makes it possible to flexibly set the target reception power value, and hence the scheduling gain is improved.

<Target Reception Power Setting Method 2 (Specific Allocation)>

With reference to the station information indicating the resource allocated by the specific allocation, which is determined by the scheduling unit 101, the target reception power setting unit 102 determines the target reception power value based on the difference of the reception power between signals that the concerned station 200 received in the past.

Figure 7B:
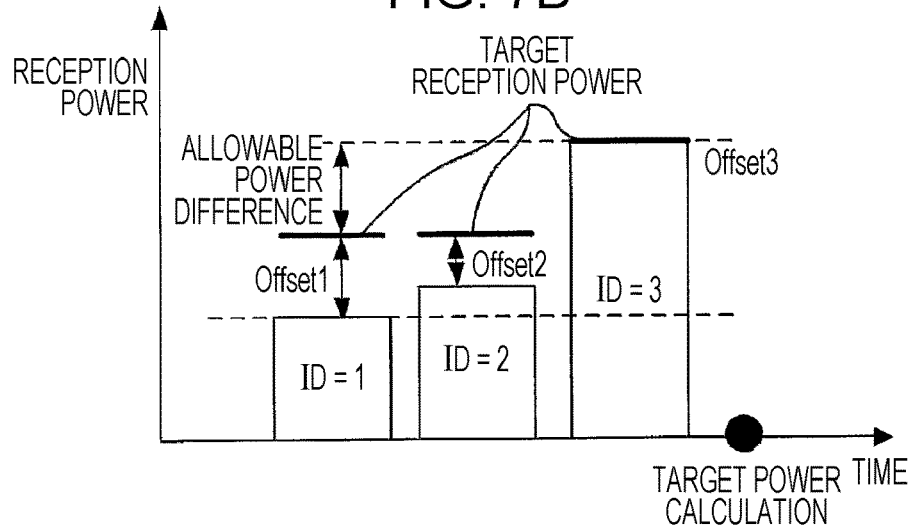
FIG. 7B is a diagram that illustrates an example of a target reception power determining method according to a target reception power setting method 2 (specific allocation) in the transmission power control information and field setting method 1 of Embodiment 1.

FIG. 7B illustrates an example of a method of determining the target reception power according to the target reception power setting method 2 (specific allocation) in the setting method 1. In FIG. 7B, assuming that the scheduling unit 101 allocates the resources to the three stations (ID=1, 2, 3), the target reception power setting unit 102 sets the offsets (offsets 1 to 3) to make the power difference fall within the allowable power difference based on the reception power difference of the signal received by the concerned station in the past.

As described above, the access point 100 sets the target reception power value based on the reception power of the signal received in the past, and thus the change of the target reception power value of each station 200 can be suppressed.

Note that, like the target reception power setting method 1 (specific allocation), the allowable power difference may be changed depending on the performance of A/D conversion and the number of multiplex stations of OFDMA/MU-MIMO as illustrated in FIGS. 8A and 8B.

<Target Reception Power Setting Method 3 (Specific Allocation)>

Using the station information indicating the resource allocated by the specific allocation, which is determined by the scheduling unit 101, the target reception power setting unit 102 calculates estimated reception power based on the maximum transmission power and the path-loss of the concerned station and determines the target reception power value based on a difference of the estimated power between the stations allocated to the resources.

Figure 7C:
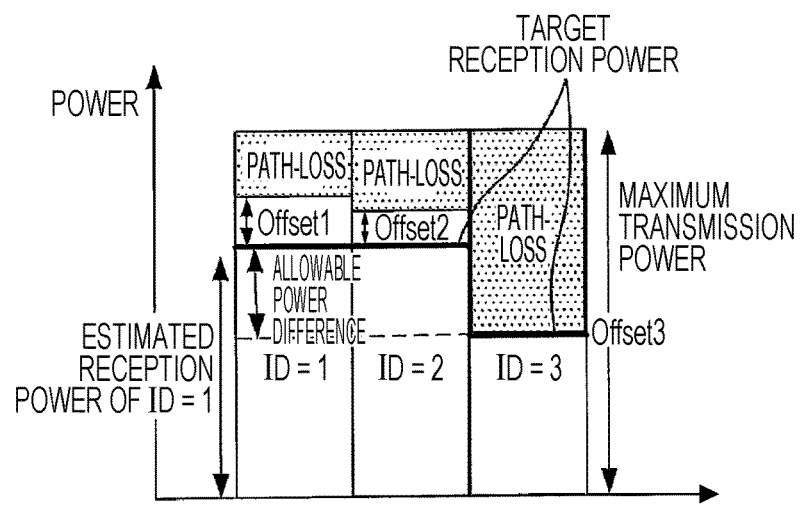
FIG. 7C is a diagram that illustrates an example of a target reception power determining method according to a target reception power setting method 3 (specific allocation) in the transmission power control information and field setting method 1 of Embodiment 1.

FIG. 7C illustrates an example of a method of determining the target reception power according to the target reception power setting method 3 (specific allocation) in the setting method 1. In FIG. 7C, assuming that the scheduling unit 101 allocates the resources to the three stations (ID=1, 2, 3), the target reception power setting unit 102 sets the offsets (offsets 1 to 3) to make the estimated reception power difference between the stations 200 fall within the allowable power difference. Note that FIG. 7C is an example of a case where the maximum transmission power of the stations 200 are equal. For example, the target reception power setting unit 102 uses a value included in an association request signal as the maximum transmission power of the station 200.

As described above, the access point 100 sets the target reception power value depending on the maximum transmission power and the path-loss of each station 200, and this can prevent setting of the target reception power value that requires transmission power greater than the maximum transmission power that the station 200 can set.

Note that, like the target reception power setting method 1 (specific allocation), the allowable power difference may be changed depending on the performance of A/D conversion and the number of multiplex stations of OFDMA/MU-MIMO as illustrated in FIGS. 8A and 8B.

Next, hereinafter, target reception power value setting methods 1 to 4 in the random access allocation are described severally with reference to FIGS. 9A to 9C.

<Target Reception Power Setting Method 1 (Random Access Allocation)>

The target reception power setting unit 102 sets an average value of the target reception power values of the stations to which the resources are allocated by the specific allocation as the target reception power value of the random access-allocation RU.

FIG. 9A illustrates a method of determining the target reception power according to the target reception power setting method 1 (random access allocation) in the setting method 1. The stations with ID=1, 2 are stations to which the resources are allocated by the specific allocation, while the station with ID=0 is a station to which the random access resource is allocated. In addition, the target reception power values of the resources of ID=1, 2 are, for example, assumed to be determined by any one of the target reception power setting methods 1 to 3 (specific allocation). In this case, the target reception power setting unit 102 calculates the target reception power of the random access resource (ID=0) based on the average value of the target reception power values of the resources of ID=1, 2.

As described above, the access point 100 sets the average value of the target reception power values of the stations to which the resources are allocated by the specific allocation as the target reception power of the random access-allocation RU, and thus the difference of the reception power between the random access-allocation station and the specific-allocation station can be reduced.

<Target Reception Power Setting Method 2 (Random Access Allocation)>

The target reception power setting unit 102 sets the lowest value of the target reception power values of the stations to which the resources are allocated by the specific allocation as the target reception power value of the random access-allocation RU.

FIG. 9B illustrates a method of determining the target reception power according to the target reception power setting method 2 (random access allocation) in the setting method 1. The stations 200 with ID=1, 2 are stations to which the resources are allocated by the specific allocation, while the station with ID=0 is a station to which the random access resource is allocated. In addition, the target reception power values of the resources of ID=1, 2 are assumed to be determined by any one of the target reception power setting methods 1 to 3 (specific allocation). The target reception power setting unit 102 calculates the target reception power value of the random access resource (ID=0) based on the lowest value of the target reception power values of the resources of ID=1, 2 (in FIG. 9B, the target reception power value of the resource of ID=2).

As described above, the access point 100 sets the lowest value of the target reception power values of the stations to which the resources are allocated by the specific allocation as the target reception power value of the random access-allocation RU, and thus the reception power difference between the random access-allocation station and another station can be prevented from increasing even when the reception power of the random access is increased. This is because the reason of the increase of the reception power of the random access is that the access point 100 may receive signals of multiple stations 200 at once due to collision.

<Target Reception Power Setting Method 3 (Random Access Allocation)>

The target reception power setting unit 102 sets average reception power of signals that all the stations or a part of the stations connected to the access point 100 received in the past as the target reception power value.

In the random access allocation, it is impossible to specify the station 200 actually transmitting the response signal. Thus, setting the average reception power of the signals that all the stations or a part of the stations connected to the access point 100 received in the past as the target reception power value allows the transmission power required for satisfying the target reception power value in the random access allocation to be likely to fall within a range between the minimum transmission power and the maximum transmission power of the station 200.

<Target Reception Power Setting Method 4 (Random Access Allocation)>

The target reception power setting unit 102 sets the target reception power to a fixed value depending on purpose.

FIG. 9C illustrates an example of purposes and the target reception power values according to a target reception power setting method 4 (random access allocation) in the setting method 1. For example, in order to preferentially receive a signal of the cell edge station, the target reception power setting unit 102 sets the target reception power value low (e.g., −75 dBm) to allow even the cell edge station to satisfy the predetermined target reception power. Meanwhile, in order to preferentially receive a signal of the station near the access point, the target reception power setting unit 102 sets a required target reception power value high (e.g., −65 dBm).

As described above, the access point 100 sets the target reception power value of the random access-allocation station depending on purpose, and thus the reception from either the cell edge station or the station near the access point can be preferentially performed.

The method of setting the target reception power value in the setting method 1 is described above.

As described above, in the setting method 1, the access point 100 notifies the station 200 of the target reception power value using the station-specific field of the random access control signal. In addition, the station 200 performs the transmission power control of the response signal based on the estimated path-loss and the target reception power value provided as notification. This can reduce the reception power difference in the access points 100 between the stations 200 to which the resources are allocated by the random access control signal, and the carrier interference and the problem of the dynamic range of A/D conversion can be solved. In addition, the access point 100 sets the target reception power value for every station 200 using the specific field of the station 200, and thus the transmission power can be set in accordance with the channel state of each station 200.

<Setting Method 2>

Figure 10:
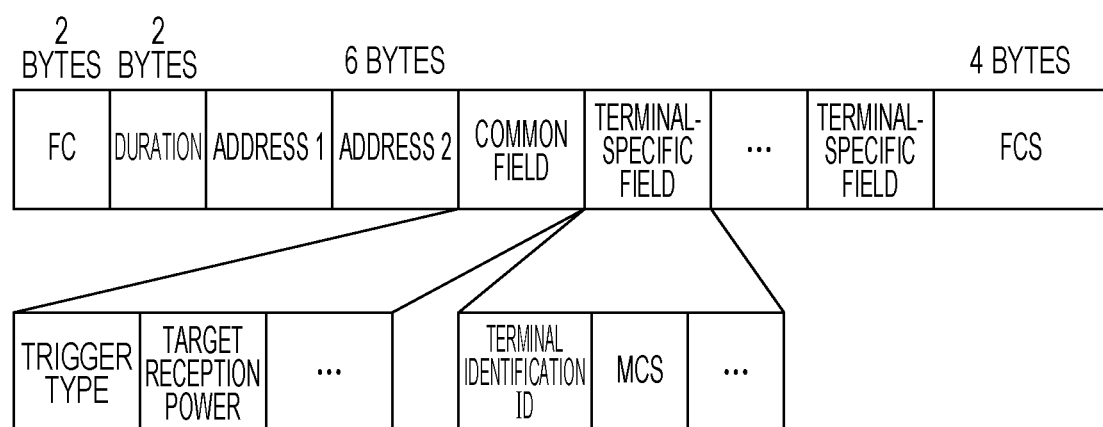
FIG. 10 is a diagram that illustrates an example of a random access control signal according to a transmission power control information and field setting method 2 of Embodiment 1.

In the setting method 2, the access point 100 (RA control signal generating unit 104) arranges the target reception power value in the common field of the random access control signal. FIG. 10 illustrates an example of the random access control signal according to the setting method 2. The Trigger type in FIG. 10 indicates a type of the trigger frame and, for example, the Trigger type is set to indicate that the trigger frame is the random access control signal.

After receiving the random access control signal, the station 200 obtains the target reception power value arranged in the station-common field. Then, based on the path-loss calculated by the path-loss estimating unit 207 and the above-described obtained target reception power value, the station 200, for example, calculates the transmission power of the response signal using Equation (3) and performs the transmission power control on the response signal.

Note that, since the target reception power values of the stations 200 are made equal in this example of setting, the reception qualities of the stations 200 are almost the same. The access point 100 can uniquely determine the MCSs of the stations 200 based on the common target reception power value. Thus, a configuration for transmitting the information such as the MCS using the common field instead of using the station-specific field may be applied. Transmitting the MCS using the common field can reduce the overhead of the random access control signal.

[Target Reception Power Value Setting Method]

Next, a method of setting the target reception power value in the access point 100 when the setting method 2 is applied is described.

Hereinafter, target reception power value setting methods 1' to 3' for the specific allocation are described severally with reference to FIGS. 11A to 11C.

<Target Reception Power Setting Method 1' (Specific Allocation)>

With reference to the station information indicating the resource allocated by the specific allocation and the MCS of each station, which are determined by the scheduling unit 101, the target reception power setting unit 102 determines the target reception power value based on the lowest required reception power of the highest MCS.

Figure 11A:
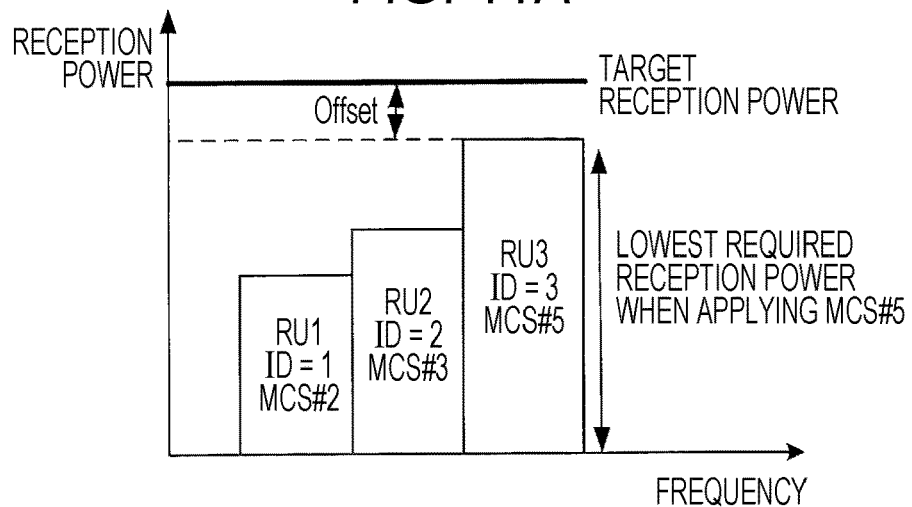
FIG. 11A is a diagram that illustrates an example of a target reception power determining method according to a target reception power setting method 1' (specific allocation) in the transmission power control information and field setting method 2 of Embodiment 1.

FIG. 11A illustrates an example of a method of determining the target reception power according to the target reception power setting method 1' (specific allocation) in the setting method 2. In FIG. 11A, the resources (RU=1, 2, 3) are respectively allocated to the three stations (ID=1, 2, 3). The MCSs of the respective stations 200 are #2, #3, and #5.

The target reception power setting unit 102 adds an offset to the lowest required reception power of the highest MCS among the MCSs #2, #3, and #5 of the stations 200, or the MCS #5 of the station ID=3, and sets that value as the target reception power value common for the stations 200.

As described above, the access point 100 sets the target reception power value common for all the stations 200 based on the highest MCS among the MCSs set in the stations 200, and thus the access point 100 can be more likely to receive the response signals of all the stations with no errors.

<Target Reception Power Setting Method 2' (Specific Allocation)>

With reference to the station information indicating the resource allocated by the specific allocation, which is determined by the scheduling unit 101, the target reception power setting unit 102 determines the target reception power value based on an average value of the reception power of the signals that the station 200 received in the past.

Figure 11B:
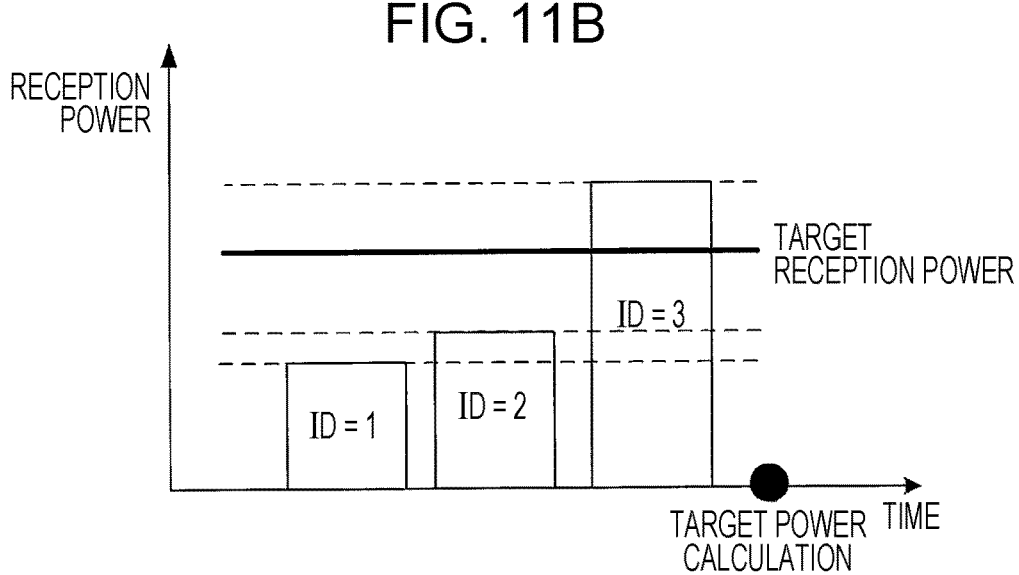
FIG. 11B is a diagram that illustrates an example of a target reception power determining method according to a target reception power setting method 2' (specific allocation) in the transmission power control information and field setting method 2 of Embodiment 1.

FIG. 11B illustrates an example of a method of determining the target reception power according to the target reception power setting method 2' (specific allocation) in the setting method 2. In FIG. 11B, assuming that the scheduling unit 101 allocates the resources to the three stations 200 (ID=1, 2, 3), the target reception power setting unit 102 sets the average value of the reception power of the signals received by the station 200 in the past as the target reception power value common for the stations 200.

As described above, the access point 100 sets the average value of the reception power of the signals received by the station 200 in the past as the target reception power value, and thus the transmission power required for satisfying the target reception power value is likely to fall within the range between the minimum transmission power and the maximum transmission power of each station 200.

<Target Reception Power Setting Method 3' (Specific Allocation)>

Using the station information indicating the resource allocated by the specific allocation, which is determined by the scheduling unit 101, the target reception power setting unit 102 calculates estimated reception power based on the maximum transmission power and the path-loss of the concerned station 200 and determines the estimated reception power of the station 200 having the lowest estimated reception power as the target reception power value common for the stations 200.

Figure 11C:
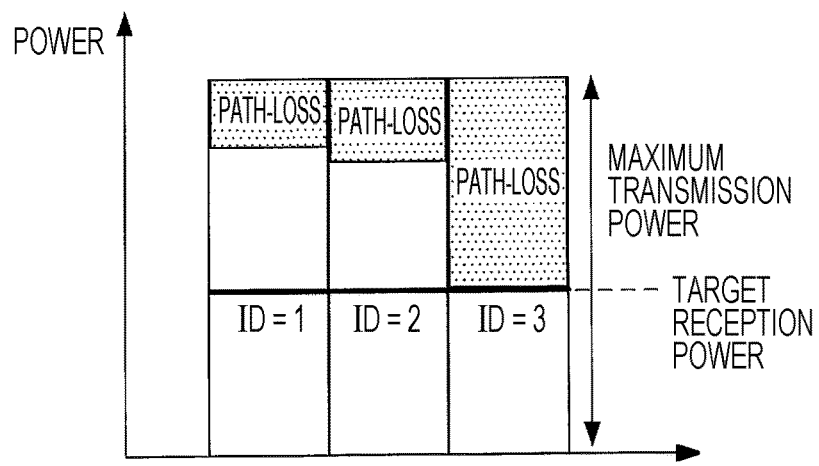
FIG. 11C is a diagram that illustrates an example of a target reception power determining method according to a target reception power setting method 3' (specific allocation) in the transmission power control information and field setting method 2 of Embodiment 1.

FIG. 11C illustrates an example of a method of determining the target reception power according to the target reception power setting method 3' (specific allocation) in the setting method 2. In FIG. 11C, assuming that the scheduling unit 101 allocates the resources to the three stations 200 (ID=1, 2, 3), the target reception power setting unit 102 sets the estimated reception power of the station 200 having the lowest estimated reception power among the stations 200, or the station ID=3, as the target reception power value common for the stations 200.

As described above, the access point 100 estimates the target reception power based on the maximum transmission power and the path-loss of each station 200 and sets the target reception power of the station 200 having the lowest target reception power as the target reception power value common for the stations 200; thus, the target reception power can be set low, and the consumed power of the station 200 and the interference in another access point 100 can be reduced. In addition, this can prevent the station 200 from setting the target reception power value that requires transmission power greater than the settable maximum transmission power.

Next, hereinafter, a method of setting the target reception power value in the random access allocation is described.

<Target Reception Power Setting Method (Random Access Allocation)>

The target reception power setting unit 102 may use a setting method similar to the target reception power setting methods 1' to 3' in the above-described setting method 2 to set the target reception power value that is set to be common for the stations 200 to which the resources are allocated by the specific allocation as the target reception power value of the random access-allocation RU. Note that the target reception power setting unit 102 may use a setting method similar to the target reception power setting method 3 (random access allocation) and the target reception power setting method 4 (random access allocation) in the setting method 1 to set the target reception power value.

The method of setting the target reception power value in the setting method 2 is described above.

As described above, in the setting method 2, the access point 100 arranges the target reception power value in the common field of the random access control signal as illustrated in FIG. 10, and thus the time length of the station-specific field can be shortened, and the overhead of the random access control signal can be reduced. The access point 100 cannot specify which station 200 among the random access-allocation stations 200 transmits the response signal and cannot individually set an appropriate value of the target reception power value to the stations 200. Thus, in a case where the proportion of the random access-allocation stations 200 is high, the performance deterioration is little even when the target reception power value is arranged in the common field.

<Setting Method 3>

In the setting method 3, like the setting method 2, the access point 100 (RA control signal generating unit 104) arranges the target reception power value in the common field of the random access control signal. Note that the target reception power value is set to different values for each type of the response signal (information) transmitted by the random access.

The type of the response signal may be, for example, data, control information, and management information. FIG. 12 illustrates an example of the target reception power value of each type of the response signal according to the setting method 3. A high target reception power value is set when the degree of importance of the response signal is high, while a low target reception power value is set when the degree of importance of the response signal is low. The example in FIG. 12 illustrates a case where the priority is high in order of the control information, the data, and the management information.

Note that the high target reception power value means that, for example, an offset of ZdB is added to the target reception power value calculated with the setting method 2. Likewise, the low target reception power value means that, for example, an offset of YdB is added to the target reception power value calculated with the setting method 2 (however, Y<Z).

In addition, for example, the response signal of high importance is a signal in which its value is updated frequently, while the response signal of low importance is a signal in which its value is not updated frequently.

Moreover, the type of the response signal may not be classified into the data, the control information, and the management information, and, for example, the management information may be further classified in details, and the target reception power value for every Probe Response and Association Response may be provided as notification.

After receiving the random access control signal, the station 200 obtains multiple target reception power values arranged in the station-common field and switches the target reception power value for use depending on the type of the signal transmitted as the response signal. Then, based on the path-loss calculated by the path-loss estimating unit 207 and the above-described selected target reception power value, the station 200, for example, calculates the transmission power of the response signal using Equation (3) and performs the transmission power control on the response signal.

As described above, in the setting method 3, the access point 100 arranges the target reception power value in the common field of the random access control signal as illustrated in FIG. 10 and also sets the target reception power value to a different value for each type of the response signal. In this way, even when the response signals collide in the random access, the response signal to which the high target reception power value is set is likely to be received with no errors in the access point 100, and thus the probability of successful reception of the signal of high importance can be increased.

<Setting Method 4>

In the setting method 4, like the setting method 2, the access point 100 arranges the target reception power value in the common field of the random access control signal. Note that the target reception power value is provided as notification in each of the specific allocation and the random access allocation.

FIG. 13 illustrates an example of the target reception power value for each allocation method according to the setting method 4. When the allocation method is the specific allocation, no collision of the response signals occurs, or the maximum transmission power and the minimum transmission power of the station 200 to which the access point 100 allocates the resource can be estimated in advance. Thus, the difference between the reception power of the response signal that the access point 100 actually receives and the target reception power value is thought to be small. Hence, when the allocation method is the specific allocation, the access point 100 sets the target reception power value relatively high.

On the other hand, the collision of the response signals may occur when the allocation method is the random access allocation, and the occurrence of the collision makes the difference between the reception power of the response signal and the target reception power value large. That is, it can be thought that the reception power of the response signal is likely to become greater than the target reception power value. Hence, when the allocation method is the random access allocation, the access point 100 sets the target reception power value relatively low.

After receiving the random access control signal, the station 200 obtains the multiple target reception power values arranged in the station-common field. Based on the station identification ID in the station-specific field, the station 200 determines whether the resource used for transmitting the response signal is the resource allocated by the random access allocation. That is, the station 200 determines that the allocation method is the specific allocation when the station identification ID is the ID of own device, and determines that the allocation method is the random access allocation when the station identification ID is the random access ID. Depending on whether the allocation method is the specific allocation or the random access allocation, the station 200 switches the target reception power value used for transmitting the response signal. Then, based on the path-loss calculated by the path-loss estimating unit 207 and the above-described selected target reception power value, the station 200, for example, calculates the transmission power of the response signal using Equation (3) and performs the transmission power control on the response signal.

As described above, in the setting method 4, the access point 100 arranges the target reception power value in the common field of the random access control signal as illustrated in FIG. 10 and also sets the target reception power value to a different value for each of the allocation methods (specific allocation, random access allocation). In this way, for example, since the reception power in the random access allocation is increased when the collision occurs, the access point 100 in the random access allocation sets the target reception power value considering the increase of the reception power due to the collision, and thus the performance deterioration of the A/D conversion and increase of the interference in another station when the collision occurs can be prevented.

<Setting Method 5>

In the setting method 5, the access point 100 arranges the target reception power value in the common field of the random access control signal. Further, the access point 100 arranges in the station-specific field an offset value from the target reception power value set to the common field (a target reception power offset).

Figure 14:
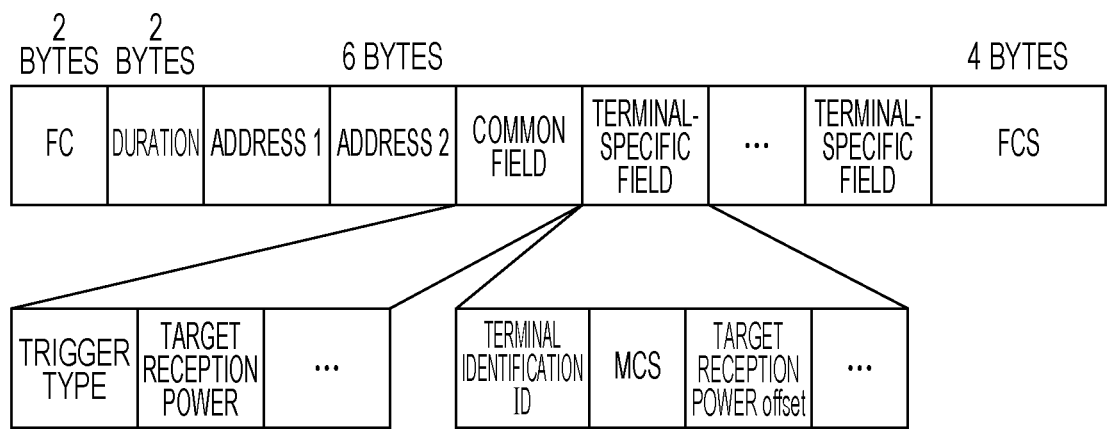
FIG. 14 is a diagram that illustrates an example of a random access control signal according to a transmission power control information and field setting method 5 of Embodiment 1.

FIG. 14 illustrates an example of the random access control signal according to the setting method 5. The Trigger type in FIG. 14 indicates a type of the trigger frame and, for example, the Trigger type is set to indicate that the trigger frame is the random access control signal.

After receiving the random access control signal, the station 200 obtains the target reception power value arranged in the station-common field. Further, the station 200 obtains the target reception power offset arranged in the station-specific field to which the STA_ID of the station 200 (own device) or the random access ID is set as the station identification ID and then adds the target reception power offset to the target reception power value obtained from the common field. Then, based on the path-loss calculated by the path-loss estimating unit 207 and the above-described obtained target reception power value, the station 200, for example, calculates the transmission power of the response signal using Equation (3) and performs the transmission power control on the response signal.

[Target Reception Power Value Setting Method]

Next, a method of setting the target reception power value in the access point 100 when the setting method 5 is applied is described.

Figure 15:
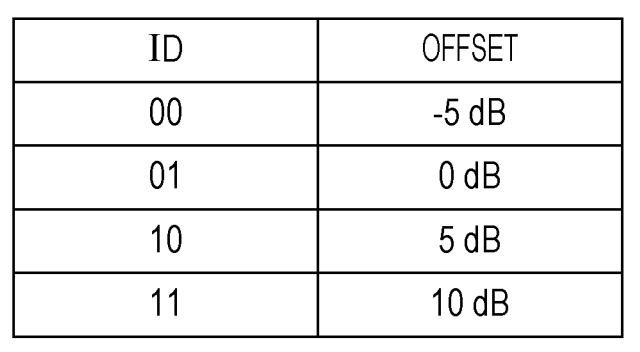

FIG. 15 is an example of a pattern of the target reception power offset according to the setting method 5. FIG. 15 illustrates the offset values when the target reception power offset is indicated by 2 bits. Note that the target reception power offset value may be any bit number as long as that the value is smaller than the bit number of the target reception power value.

The target reception power value when the setting method 5 is applied is calculated in the procedure similar to the setting method 1. Note that, in the setting method 1, the target reception power value individually set to the station 200 is set to the station-specific field of the random access control signal, but in the setting method 5, the access point 100, for example, calculates an average value of the target reception power values obtained for each station 200 and sets the average value to the common field of the random access control signal. Further, the access point 100 measures a difference between the target reception power value of each station 200 and the average value, quantizes the difference of the averaged target reception power value using the table in FIG. 15, generates the target reception power offset, and sets that to the station-specific field.

As described above, in the setting method 5, the access point 100 arranges the target reception power value in the common field of the random access control signal as illustrated in FIG. 14 and also arranges in the station-specific field the offset value from the target reception power value set to the common field. In this way, since the bit number of the target reception power offset is smaller than the bit number of the target reception power value, the total time length of the common field and the station-specific field can be shortened when there are many stations of the allocation, and thus the overhead of the random access control signal can be reduced.

<Setting Method 6>

In the setting method 6, the access point 100 sets different transmission power control information to the station-specific field of the random access control signal for the specific-allocation station and the random access-allocation station. For instance, the access point 100 arranges a transmission power value for transmitting the upstream signal in the station-specific field for the specific-allocation station, and arranges the target reception power value in the station-specific field for the random access-allocation station.

Figure 16:
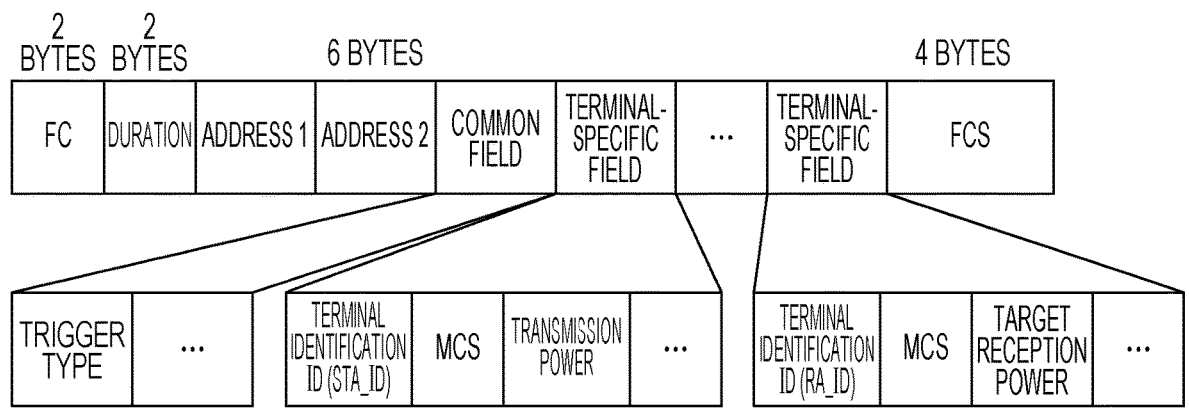
FIG. 16 is a diagram that illustrates an example of a random access control signal according to a transmission power control information and field setting method 6 of Embodiment 1.

FIG. 16 illustrates an example of the random access control signal according to the setting method 6. The Trigger type in FIG. 16 indicates a type of the trigger frame and, for example, the Trigger type is set to indicate that the trigger frame is the random access control signal.

The access point 100 arranges the transmission power value in a field of the station-specific field to which the control signal for the specific allocation, or the unique ID (STA_ID) for discriminating the station 200, is set. On the other hand, the access point 100 arranges the target reception power value in a field of the station-specific field to which the control signal for the random access allocation, or the random access ID (RA_ID), is set.

After receiving the random access control signal, when there is the station-specific field to which the STA_ID of the station 200 is set as the station identification ID, the station 200 obtains the transmission power value arranged in the concerned station-specific field and performs the transmission power control on the response signal based on the obtained transmission power. On the other hand, when there is the station-specific field to which the random access ID is set as the station identification ID, the station 200 obtains the target reception power value arranged in the concerned station-specific field, and, based on the path-loss calculated by the path-loss estimating unit 207 and the above-described obtained target reception power value, the station 200, for example, calculates the transmission power of the response signal using Equation (3) and performs the transmission power control on the response signal.

[Target Reception Power Value Setting Method]

Next, a method of setting the target reception power value in the access point 100 when the setting method 6 is applied is described. Like the setting method 1, the access point 100 obtains the target reception power value of each station 200.

Since the transmission power needs to be set to the specific-allocation station in the setting method 6, the access point 100, for example, calculates the transmission power of the station 200 using Equation (3). Then, for the specific-allocation station, the access point 100 sets the calculated transmission power value to the station-specific field of the random access control signal. Note that the format (bit number) of the target reception power value and the transmission power value may be the same.

As described above, when the station 200 is not notified of the transmission antenna gain and the transmission antenna gain has a large effect, calculating the transmission power by the access point 100 for the specific-allocation station allows the transmission power control to be performed more accurately. In addition, since the path-loss calculation processing and the transmission power calculation processing in the station 200 side can be omitted by notifying the specific-allocation station of the transmission power, the power consumption of the station 200 can be reduced. Moreover, when the formats (bit numbers) of the transmission power value and the target reception power value are the same, the position to which the station identification ID is set is the same as before; thus, there is no increase of complexity of the processing for determining the position of the station identification ID.

<Setting Method 7>

In the setting method 7, the access point 100 arranges the target reception power value for the random access-allocation station in the common field of the random access control signal and arranges the target reception power value for the specific-allocation station in the station-specific field of the random access control signal.

Figure 17:
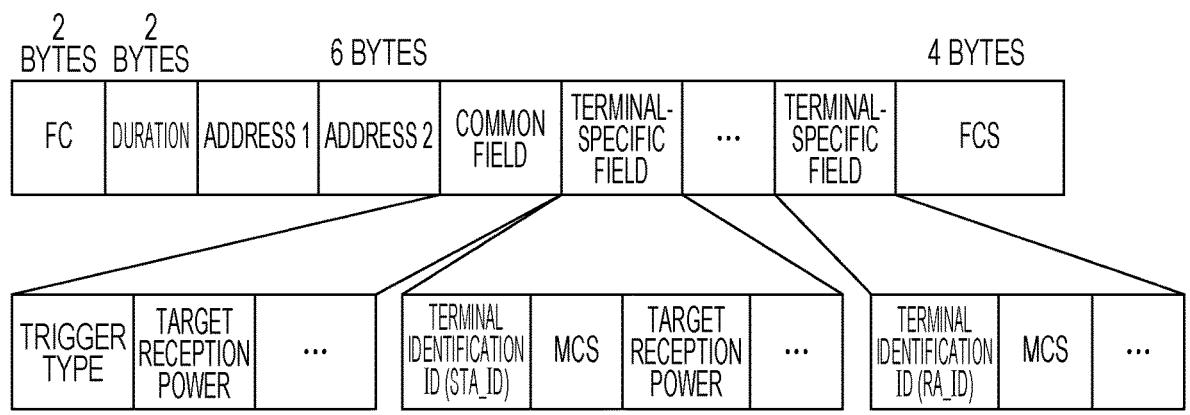
FIG. 17 is a diagram that illustrates an example of a random access control signal according to a transmission power control information and field setting method 7 of Embodiment 1.

FIG. 17 illustrates an example of the random access control signal according to the setting method 7. The Trigger type in FIG. 17 indicates a type of the trigger frame and, for example, the Trigger type is set to indicate that the trigger frame is the random access control signal. The access point 100 arranges the target reception power value in the station-specific field to which the unique ID (STA_ID) for discriminating the station 200 is set and arranges no target reception power value in the station-specific field to which the random access ID (RA_ID) is set. In addition, the access point 100 arranges the target reception power value for the random access-allocation station in the common field.

After receiving the random access control signal, when there is the station-specific field to which the STA_ID of the station 200 is set as the station identification ID, the station 200 obtains the target reception power value arranged in the concerned station-specific field and performs the transmission power control of the response signal based on the obtained target reception power value. On the other hand, when no STA_ID of the station 200 is set as the station identification ID, the station 200 obtains the target reception power value arranged in the common field, and, based on the path-loss calculated by the path-loss estimating unit 207 and the above-described obtained target reception power value, the station 200, for example, calculates the transmission power of the response signal using Equation (3) and performs the transmission power control on the response signal.

As described above, in the setting method 7, the access point 100 arranges the target reception power value in the common field of the random access control signal for the random access-allocation station as illustrated in FIG. 17 and arranges the target reception power value in the station-specific field of the random access control signal for the specific-allocation station. This allows the total time length of the common field and the station-specific field to be shortened when there are many random access-allocation stations, and thus the overhead of the random access control signal can be reduced. In addition, the access point 100 cannot specify which station 200 among the random access-allocation stations transmits the response signal and cannot individually set an appropriate value of the target reception power value to the stations 200. Hence, in a case where the proportion of the random access-allocation station 200 is high, the performance deterioration is little even when the target reception power value is arranged in the common field.

The transmission power control information and field setting methods 1 to 7 in this embodiment are described above.

[Path-Loss Feedback Timing]

Next, timing when the station 200 provides the path-loss as feedback to the access point 100 in a case where the access point 100 uses the path-loss to calculate the target reception power value in this embodiment is described.

Hereinafter, timing 1 to 4 when the station 200 provides the path-loss as feedback is severally described.

<Timing 1>

Figure 18:
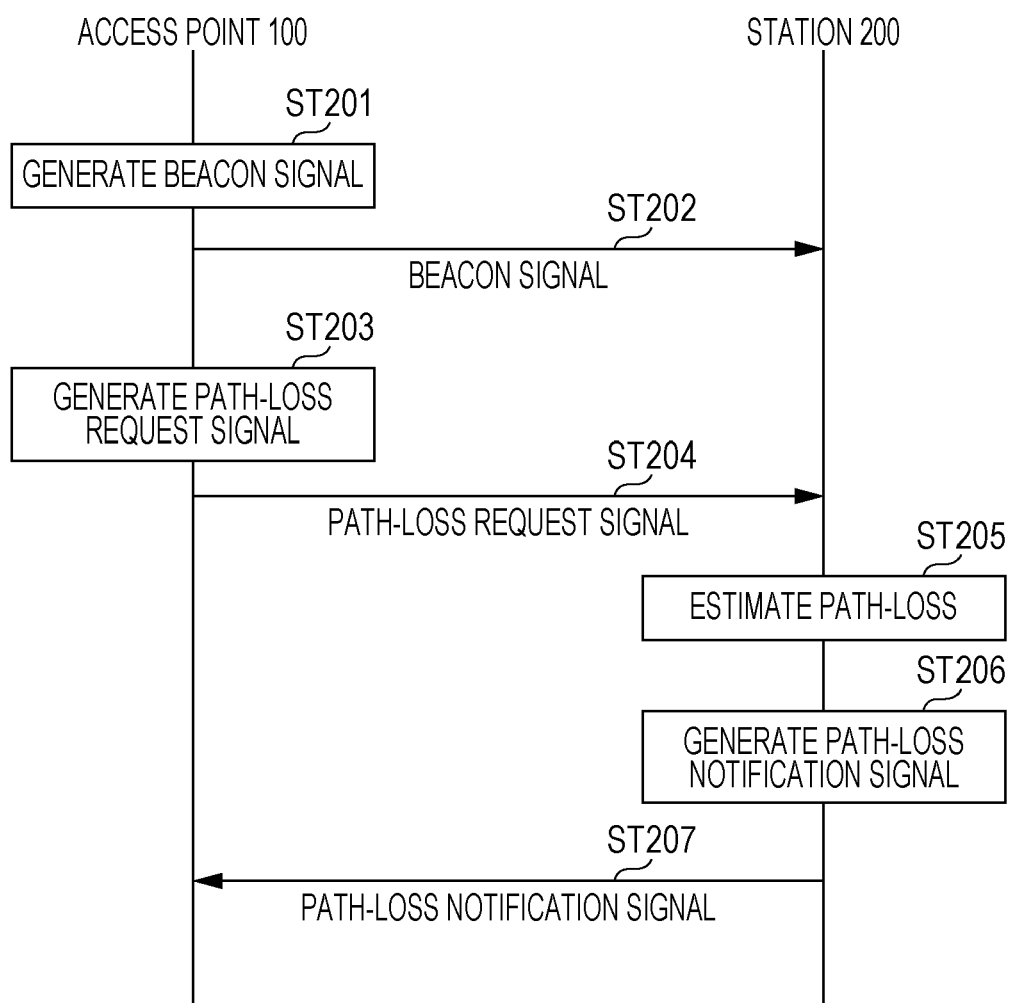
FIG. 18 is a flowchart according to path-loss feedback timing 1 of Embodiment 1.

In the timing 1, the station 200 transmits a path-loss notification signal to the access point 100 as a response to a request signal (path-loss request signal) from the access point 100. FIG. 18 illustrates an example of a sequence of processing of the path-loss feedback according to the timing 1.

In FIG. 18, the access point 100 generates a beacon signal (ST201). The beacon signal includes the transmission power of the access point 100.

The access point 100 wirelessly notifies the station 200 of the generated beacon signal (ST202).

Next, the access point 100 regularly generates the path-loss request signal (ST203). The path-loss request signal is generated as an action frame, for example. The action frame is a frame for setting Measurement Request, TPC request, and the like (e.g., see IEEE STD 802.11H-2003).

The access point 100 wirelessly notifies the station 200 of the generated path-loss request signal (ST204).

When receiving the path-loss request signal, the station 200 estimates the path-loss based on the transmission power, the antenna gain, and the like that are provided as notification by the beacon signal, and the like (ST205). The path-loss estimation is represented by Equation (1) or Equation (2), for example.

Next, the station 200 generates a path-loss notification signal (ST206). The path-loss notification signal is generated as the action frame, for example.

The station 200 wirelessly notifies the access point 100 of the generated path-loss notification signal (ST207).

As described above, in the timing 1, the station 200 transmits the path-loss to the access point 100 as a response to the path-loss request signal. This allows the station 200 to notify the access point 100 of the path-loss in timing when the access point 100 needs the path-loss.

<Timing 2>

Figure 19:
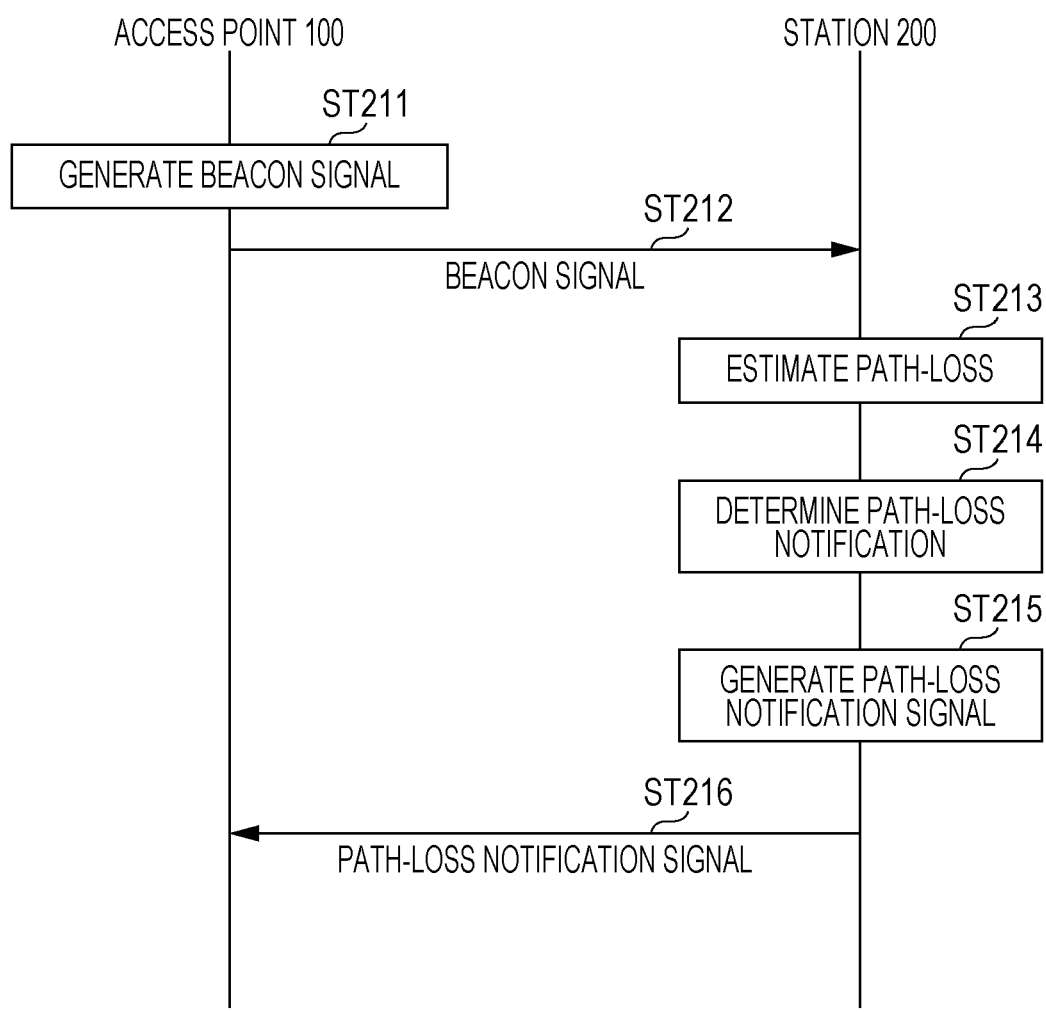
FIG. 19 is a flowchart according to path-loss feedback timing 2 of Embodiment 1.

In the timing 2, the station 200 regularly estimates the path-loss, and when the amount of path-loss change from the last timing when the path-loss is provided as notification reaches a certain criterion, or when a certain time passed from the last timing when the path-loss is provided as notification, the station 200 transmits the path-loss notification signal to the access point 100. FIG. 19 illustrates an example of a sequence of processing of the path-loss feedback according to the timing 2.

In FIG. 19, the access point 100 generates a beacon signal (ST211). The beacon signal includes the transmission power of the access point 100.

The access point 100 wirelessly notifies the station 200 of the generated beacon signal (ST212).

The station 200 regularly estimates the path-loss based on the transmission power, the antenna gain, and the like that are provided as notification by the beacon signal (ST213). The path-loss estimation is represented by Equation (1) or Equation (2), for example. The signal used in the path-loss estimation may be a signal that is received immediately before the path-loss estimation.

As for the estimated path-loss, the station 200 determines whether the amount of path-loss change from the last timing when the path-loss is provided as notification reaches the certain criterion, or whether a certain time passed from the last timing when the path-loss is provided as notification.

When the determination condition is satisfied, the station 200 generates the path-loss notification signal (ST215). The path-loss notification signal is generated as the action frame, for example.

The station 200 wirelessly notifies the access point 100 of the generated path-loss notification signal (ST216).

As described above, in the timing 2, the station 200 notifies the access point 100 of the path-loss only at the timing when the path-loss is changed. This can reduce the overhead of the control information.

<Timing 3>

Figure 20:
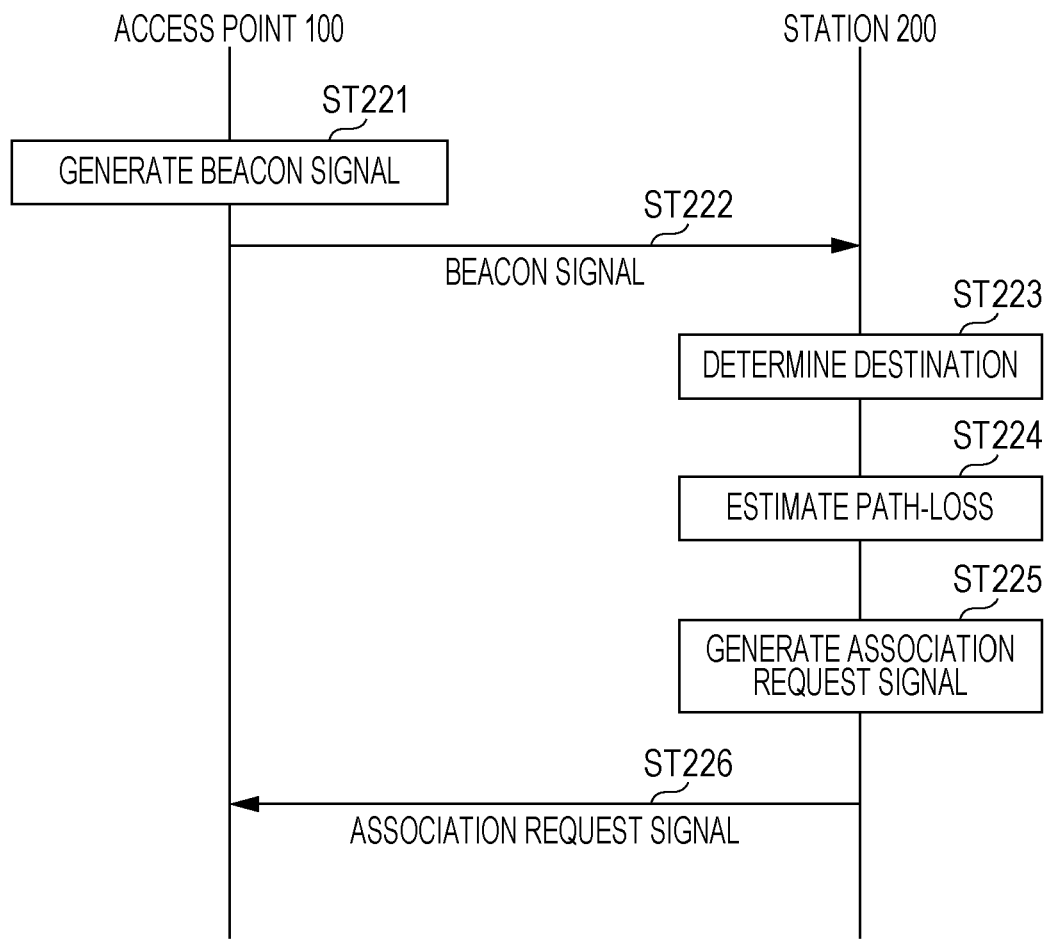
FIG. 20 is a flowchart according to path-loss feedback timing 3 of Embodiment 1.

In the timing 3, the station 200 determines the access point 100 to be connected and includes the path-loss estimated by the station 200 into the association request signal when transmitting the association request signal. FIG. 20 illustrates an example of a sequence of processing of the path-loss feedback according to the timing 3.

In FIG. 20, the access point 100 generates a beacon signal (ST221). The beacon signal includes the transmission power of the access point 100.

The access point 100 wirelessly notifies the station 200 of the generated beacon signal (ST222).

The station 200 selects the access point 100 as a connection destination based on the reception quality and the like (ST223).

The station 200 estimates the path-loss based on the transmission power, the antenna gain, and the like that are provided as notification by the beacon signal (ST224). The path-loss estimation is represented by Equation (1) or Equation (2), for example.

The station 200 generates the association request signal (ST225). The association request signal is a signal for notifying the access point 100 as the connection destination of the information on the station 200 (e.g., see IEEE STD 802.11-2012). The station 200 includes the estimated path-loss into this association request signal.

The station 200 wirelessly notifies the access point 100 of the generated association request signal (ST226).

As described above, in the timing 3, the path-loss is included in the association request signal, and thus the overhead of the control information can be more reduced than a case where the path-loss is transmitted independently.

<Timing 4>

Figure 21:
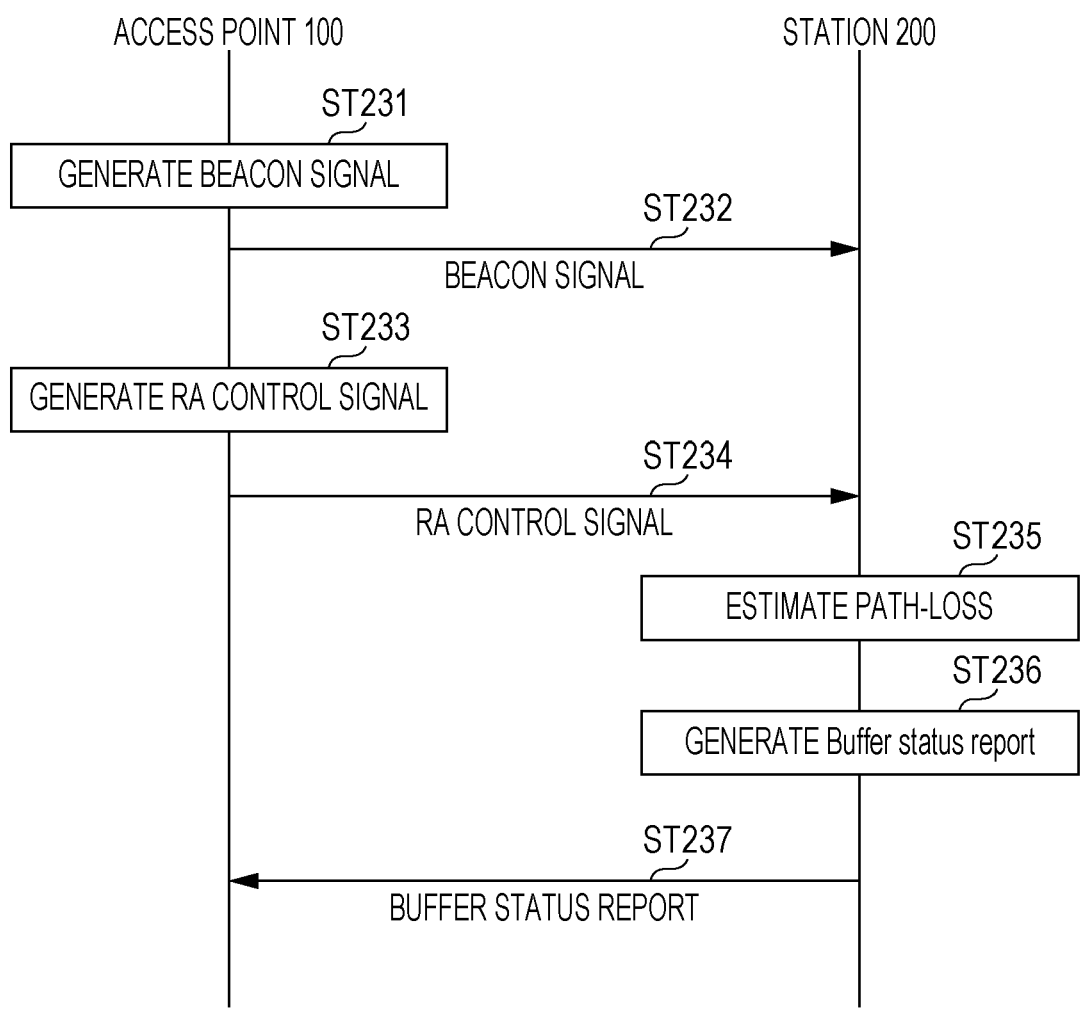
FIG. 21 is a flowchart according to path-loss feedback timing 4 of Embodiment 1.

In the timing 4, the station 200 includes the path-loss estimated by the station 200 into the buffer status report when transmitting the buffer status report as a response to the random access control signal. FIG. 21 illustrates an example of a sequence of processing of the path-loss feedback according to the timing 4.

In FIG. 21, the access point 100 generates a beacon signal (ST231). The beacon signal includes the transmission power of the access point 100.

The access point 100 wirelessly notifies the station 200 of the generated beacon signal (ST232).

In order to check the buffer status of the station 200, the access point 100 generates the random access control signal for requesting the buffer status report (ST233).

The access point 100 wirelessly notifies the station 200 of the generated random access control signal (ST234).

The station 200 estimates the path-loss based on the transmission power, the antenna gain, and the like that are provided as notification by the beacon signal (ST235). The path-loss estimation is represented by Equation (1) or Equation (2), for example.

The station 200 generates the buffer status report for providing the buffer status of own device as notification (ST236). The station 200 also includes the estimated path-loss into this buffer status report.

The access point 100 wirelessly notifies the station 200 of the generated buffer status report (ST237).

As described above, in the timing 4, the station 200 simultaneously transmits the buffer status report and the path-loss, and thus the overhead of the control information can be more reduced than a case where the path-loss is transmitted independently. In addition, the buffer status report and the path-loss are used for scheduling of the random access and the transmission power control, and since the timing of use is the same, the efficiency is improved by this simultaneous feedback.

The path-loss feedback timings 1 to 4 are described above.

As described above, in this embodiment, the access point 100 notifies the station 200 of the target reception power value using the random access control signal, and the station 200 calculates the transmission power based on the estimated path-loss and the target reception power value provided as notification and performs the transmission power control. In this way, the access point 100 can reduce the reception power difference between the stations 200 when the multiple stations 200 receive the multiplexed signals via UL MU-MIMO or OFDMA. Thus, it is possible to reduce the MU interference and make the reception signal fall within the dynamic range of A/D conversion. As described above, according to this embodiment, the transmission power control is effectively performed in the UL response signal for the MU transmission by the random access, and the reception power difference between the stations 200 is reduced; thus, the carrier interference and the problem of the dynamic range of A/D conversion can be solved.

In addition, in this embodiment, the target reception power value is provided as notification using the random access control signal, and thus the target reception power value can be dynamically changed at every scheduling depending on the reception qualities of the random access-allocation station or the specific-allocation station; hence, the optimum adaptation modulation can be immediately applied to each station 200. This can improve the system throughput in this embodiment.

Embodiment 2

As described above, the access point notifies the station of the target reception power value using the random access control signal and performs the transmission power control at the station side, and thus the reception power difference between the stations in the access point can be reduced when the access point receives a signal in which signals from the multiple stations are multiplexed via UL MU-MIMO or OFDMA.

However, an 11ax-compliant station has low performance of the transmission power control. For example, among the 11ax-compliant stations, there may be a station that can change the transmission power for only few stages and a station that has no function of the transmission power control in some cases. Thus, in each station, regardless of the calculation of the transmission power based on the target reception power value and the like provided as notification, the response signal may not be transmitted with the transmission power satisfying the target reception power value on the access point side, due to the limits of the maximum transmission power, the minimum transmission power, and the transmission power variable range of the station.

Thus, in this embodiment, a method of controlling transmission of the station when it is difficult to satisfy the target reception power value due to the limits of the maximum transmission power, the minimum transmission power, and the transmission power variable range of the station. This can reduce the reception power difference between the stations in the access point.

Figure 22:
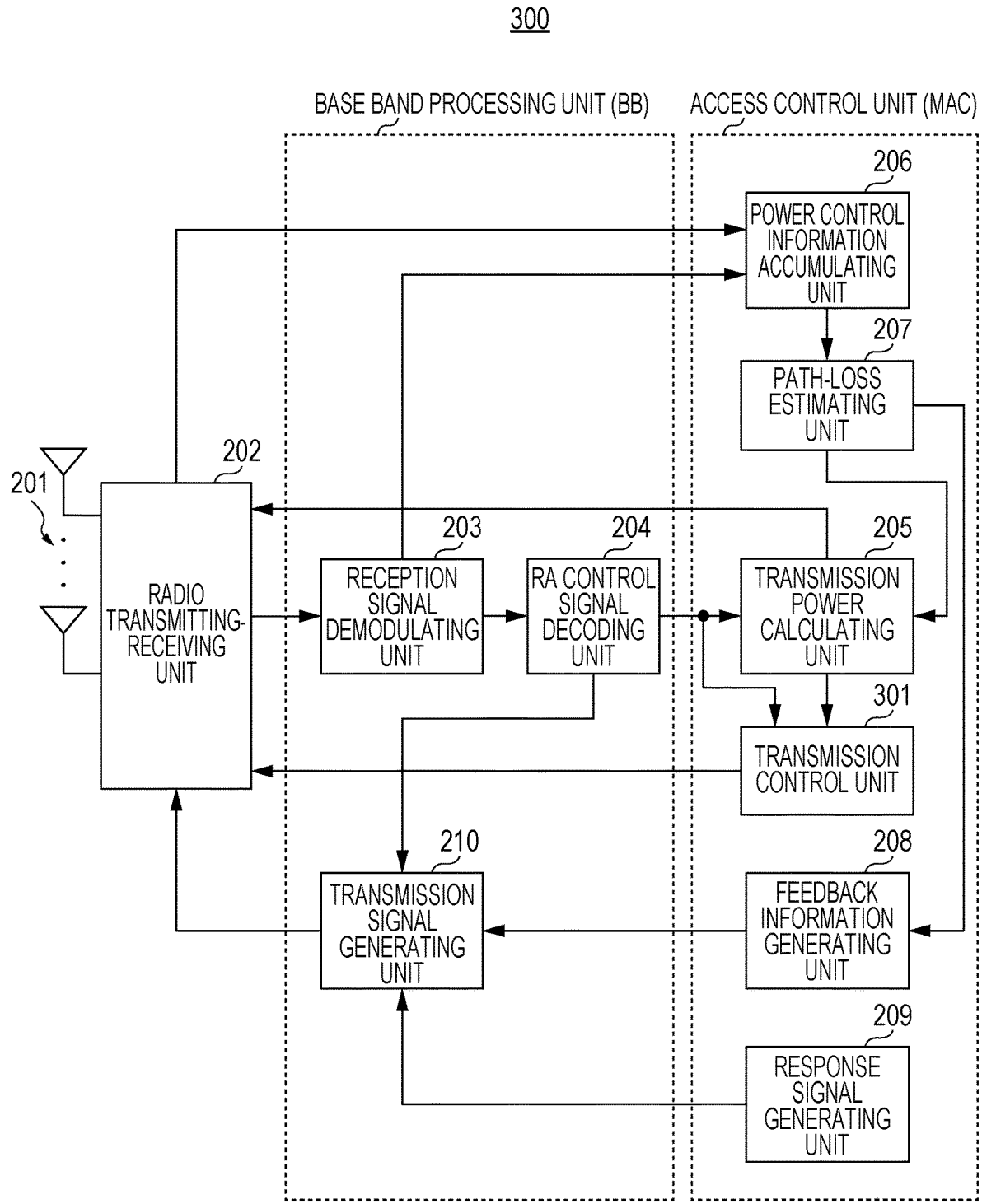
FIG. 22 is a block diagram that illustrates a configuration of a station according to Embodiment 2.

FIG. 22 is a block diagram that illustrates a configuration of a station 300 according to this embodiment. FIG. 22 differs from FIG. 5 in that the information outputted by the transmission power calculating unit 205 and the information outputted by the RA control signal decoding unit 204 are inputted to a transmission control unit 301, and the output of the transmission control unit 301 is inputted to the radio transmitting-receiving unit 202. In addition, the configuration of the access point 100 is the same as that in Embodiment 1 (FIG. 4).

This embodiment differs from Embodiment 1 in that the transmission control unit 301 controls the radio transmitting-receiving unit 202 depending on a value of the calculated transmission power and stops the transmission of the signal (details are described later).

Based on the target reception power value inputted from the RA control signal decoding unit 204 and the path-loss value inputted from the path-loss estimating unit 207, the transmission power calculating unit 205, for example, calculates the transmission power using Equation (3).

Based on the transmission power value inputted from the transmission power calculating unit 205, the information inputted from the RA control signal decoding unit 204 (target reception power value and the like), and the maximum transmission power, the minimum transmission power, and the transmission power variable range of the station 300, in terms of whether it is possible to set the transmission power satisfying the condition that the transmission power falls within the allowable power difference of the target reception power value, the transmission control unit 301 determines whether to stop the transmission of the concerned signal and outputs information indicating whether to stop the transmission, to the radio transmitting-receiving unit 202. Note that a method of determining whether to stop the transmission is described later.

When there is an instruction to stop the transmission from the transmission control unit 301, the radio transmitting-receiving unit 202 does not transmit the concerned signal. On the other hand, when there is no instruction to stop the transmission from the transmission control unit 301, the radio transmitting-receiving unit 202 performs predetermined radio transmitting processing such as D/A conversion on a signal inputted from the transmission signal generating unit 210 and up conversion on the carrier frequency, and transmits the radio transmission processed signal via the antenna 201.

Hereinafter, determining methods 1 to 6 of determining whether to stop the transmission are described severally.

<Determining Method 1>

In the determining method 1, the transmission control unit 301 issues no instruction to stop the transmission with any transmission power.

As described above, in the determining method 1, since the transmission control unit 301 issues no instruction to stop the transmission, depending on the limits of the transmission power, the power difference of the reception signals in the access point 100 may be equal to or greater than a predetermined value when there are many stations 300 to which no transmission power falling within the allowable power difference of the target reception power value can be set. However, when the number of the stations is small, the reception power difference is likely to fall within the predetermined range; thus, if the transmission control unit 301 issues no instruction to stop the transmission, the resource can be effectively used. In addition, when the performance of A/D conversion of the access point 100 is high, there is no problem of the dynamic range of A/D conversion due to the transmission power difference.

<Determining Method 2>

In the determining method 2, when no transmission power falling within the allowable power difference of the target reception power value can be set as the transmission power calculated by the transmission power calculating unit 205 due to the limits of the maximum transmission power, the minimum transmission power, and the transmission power variable range of the station 300, the transmission control unit 301 issues the instruction to stop the transmission.

As described above, when no transmission power falling within the allowable power difference of the target reception power value of the station 300 can be set, the transmission control unit 301 always stops the transmission. This can prevent the reception power difference between the stations 300 from increasing due to the unsatisfied target reception power value. In addition, stopping the transmission of the signal that may fail with the reception due to the unsatisfied target reception power value can decrease the probability of collision in the random access allocation.

<Determining Method 3>

In the determining method 3, in the specific allocation, the transmission control unit 301 issues no instruction to stop the transmission with any transmission power. On the other hand, in the random access allocation, when no transmission power falling within the allowable power difference of the target reception power value can be set due to the limits of the maximum transmission power, the minimum transmission power, and the transmission power variable range of the station 300, the transmission control unit 301 issues the instruction to stop the transmission.

As described above, the station 300 issues the instruction to stop the transmission depending on the transmission power only to the station 300 for which the target reception power value is possibly set in the access point 100 in the random access allocation where it cannot be determined which station 300 actually transmits the response signal in the access point 100, that is, in a situation where the transmission power control performance such as the maximum transmission power and the minimum transmission power of the station 300 is unknown. This can prevent the reception power difference between the stations 300 from increasing due to the unsatisfied target reception power value. On the other hand, in the specific allocation, the target reception power value can be set in the access point 100 while taking into consideration the transmission power control performance such as the maximum transmission power and the minimum transmission power of the station 300 to which the resource is allocated. Thus, since the target reception power value is rarely changed a lot because of the limit of the transmission power, always transmitting the response signal in the specific-allocation station regardless of the transmission power can increase the efficiency of use of the resource.

<Determining Method 4>

In the determining method 4, the access point 100 signals the station 300 of whether to stop the transmission when no transmission power falling within the allowable power difference of the target reception power value can be set due to the limits of the maximum transmission power, the minimum transmission power, and the transmission power variable range of the station 300. Based on the signaling (0: do not transmit, 1: transmit), the station 300 indicates whether to stop the transmission.

As described above, the station 300 shifts whether to stop the transmission by the signaling from the access point 100 when no transmission power falling within the allowable power difference of the target reception power value can be set, and thus the transmission control can be changed depending on the performance of A/D conversion of the access point 100.

<Determining Method 5>

In the determining method 5, in the specific allocation, the transmission control unit 301 issues no instruction to stop the transmission with any transmission power, and in the random access allocation, depending on BSS LOAD provided as notification by the beacon, the transmission control unit 301 issues the instruction to stop the transmission when no transmission power falling within the allowable power difference of the target reception power value can be set due to the limits of the maximum transmission power, the minimum transmission power, and the transmission power variable range of the station 300. That is, the transmission control unit 301 issues no instruction to stop the transmission when BSS LOAD is low and issues the instruction to stop the transmission when BSS LOAD is high. BSS LOAD is information that the access point 100 notifies the station 300 by the beacon of the congestion degree based on the number of stations connected to the BSS and the traffic state (e.g., see IEEE STD 802.11-2012).

As described above, the station 300 shifts whether to stop the transmission in the random access allocation depending on BSS LOAD and, when the possibility of collision in the random access is high (that is, when BSS LOAD is high), stops the transmission of the signal that may fail with the reception due to the unsatisfied target reception power value; thus, the collision probability in the random access can be decreased.

<Determining Method 6>

In the determining method 6, in the specific allocation, the transmission control unit 301 issues no instruction to stop the transmission with any transmission power, and in the random access allocation, the transmission control unit 301 shifts whether to stop the transmission depending on the type of the response signal.

The type of the response signal may be, for example, the data, the control information, and the management information. FIG. 23 illustrates an example that the transmission is stopped or not depending on the type of the response signal according to the determining method 6. When the type of the response signal is of high importance, the transmission control unit 301 issues no instruction to stop the transmission with any transmission power. On the other hand, when the type of the response signal is of low importance and when no transmission power falling within the allowable power difference of the target reception power value can be set due to the limits of the maximum transmission power, the minimum transmission power, and the transmission power variable range of the station 300, the transmission control unit 301 issues the instruction to stop the transmission.

As described above, the station 300 shifts whether to stop the transmission in the random access allocation depending on the type of the response signal, and thus it is possible to prevent a situation where the signal of high importance cannot be transmitted in the random access. Note that the operation in response to the instruction to stop the transmission is not limited to completely stopping the transmission. For example, an operation may be allowed to decrease the priority by reducing the transmission probability of the random access.

The methods 1 to 6 of determining whether to stop the transmission in the transmission control unit 301 are described above.

Note that the access point 100 may notify the station 300 of the shifting of the above-described determining methods using the management frame such as the beacon, Probe Response, and Association Response, and may include the shifting into the random access control signal to be broadcast to the station 300. Controlling by the management frame makes it possible to set an appropriate value for each BSS. In addition, even though performing the control at every transmission of the random access control signal increases the overhead, in an environment where the state of the station 300 greatly changes, appropriate control following that changes can be achieved.

As described above, in this embodiment, the transmission control unit 301 stops the transmission processing of the station 300 depending on the situation when the station 300 cannot transmit the UL response signal with the transmission power satisfying the target reception power provided as notification from the access point 100 due to the transmission power control capability (performance) the limits of the maximum transmission power, the minimum transmission power, and the transmission power variable range of the station 300. This can reduce the reception power difference between the stations 300 in the access point 100 regardless of the limits of the performance of the station 300, or the limits of the maximum transmission power, the minimum transmission power, and the transmission power variable range of the station 300. Hence, according to this embodiment, it is possible to reduce the MU interference and make the reception signal fall within the dynamic range of A/D conversion, and thus the system throughput can be improved.

Embodiment 3

As described above, the station stops the transmission of the response signal that cannot satisfy the target reception power depending on the situation, and thus the reception power difference between the stations in the access point can be reduced regardless of the performance of the station. However, depending on the setting of the target reception power value, stopping the transmission may increase the number of the stations that have significantly decreased opportunities for transmitting the response signal.

Thus, in this embodiment, a method of preventing the significant decrease of the opportunities for transmitting the response signal of a specific station, such as a station with a low capability in controlling the transmission power, by changing the target reception power value and the like at every transmission when the random access control signals are successively transmitted.

Figure 24:
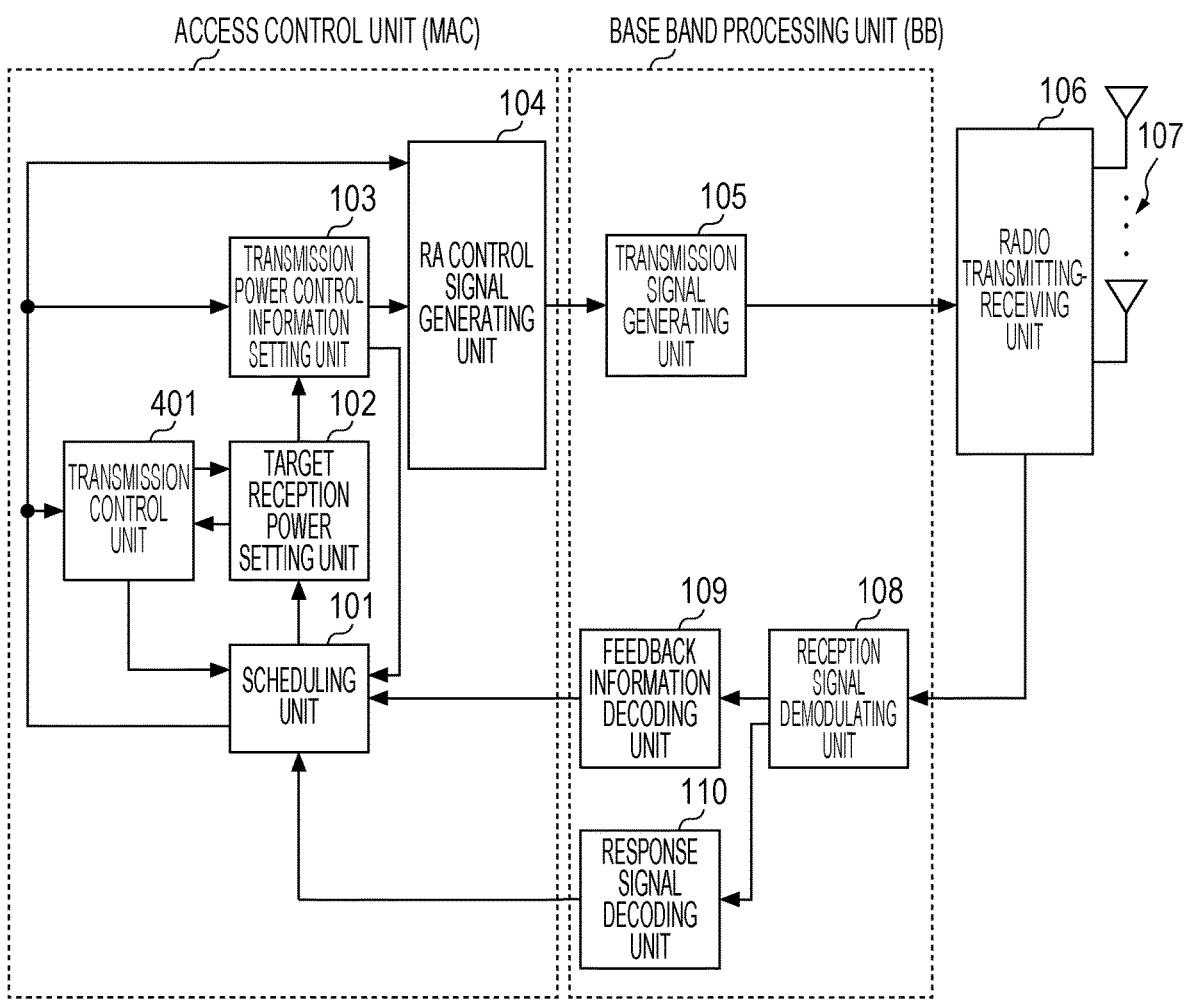
FIG. 24 is a block diagram that illustrates a main configuration of an access point according to Embodiment 3.

FIG. 24 is a block diagram that illustrates a configuration of an access point 400 according to this embodiment. FIG. 24 differs from FIG. 4 in that the resource allocation information determined by the scheduling unit 101 and the target reception power value calculated by the target reception power setting unit 102 are inputted to a transmission control unit 401, and the transmission control unit 401 outputs information for instructing control to the scheduling unit 101 and the target reception power setting unit 102. Note that the configuration of the station 300 is the same as that in Embodiment 2 (FIG. 22).

This embodiment differs from Embodiment 1 in that, when the random access control signals are successively transmitted, the transmission control unit 401 controls operations of the scheduling unit 101 and the target reception power setting unit 102 at every one of successive transmissions (details are described later).

The resource allocation information determined by the scheduling unit 101 and the target reception power value calculated by the target reception power setting unit 102 are inputted to the transmission control unit 401. The transmission control unit 401 stores the inputted resource allocation information (including the MCS) and the target reception power value at every transmission of the random access control signal.

When the successive random access control signals are transmitted, the transmission control unit 401 controls the target reception power value included in the random access control signal. Specifically, when the random access control signals are successively transmitted, based on the target reception power value provided as notification to the station 300 using the random access control signal in the past and the resource allocation information, the transmission control unit 401 controls the scheduling unit 101 and the target reception power setting unit 102 to set different target reception power value and the resource allocation information at every successive transmission. Note that the controlling method in the transmission control unit 401 is described later.

Based on the contents indicated by the transmission control unit 401, the scheduling unit 101 determines the resource allocation and outputs the resource allocation information to the transmission power control information setting unit 103 and the RA control signal generating unit 104. The target reception power setting unit 102 sets the target reception power value based on the contents indicated by the transmission control unit 401 and outputs the target reception power value to the transmission power control information setting unit 103.

Figure 25:
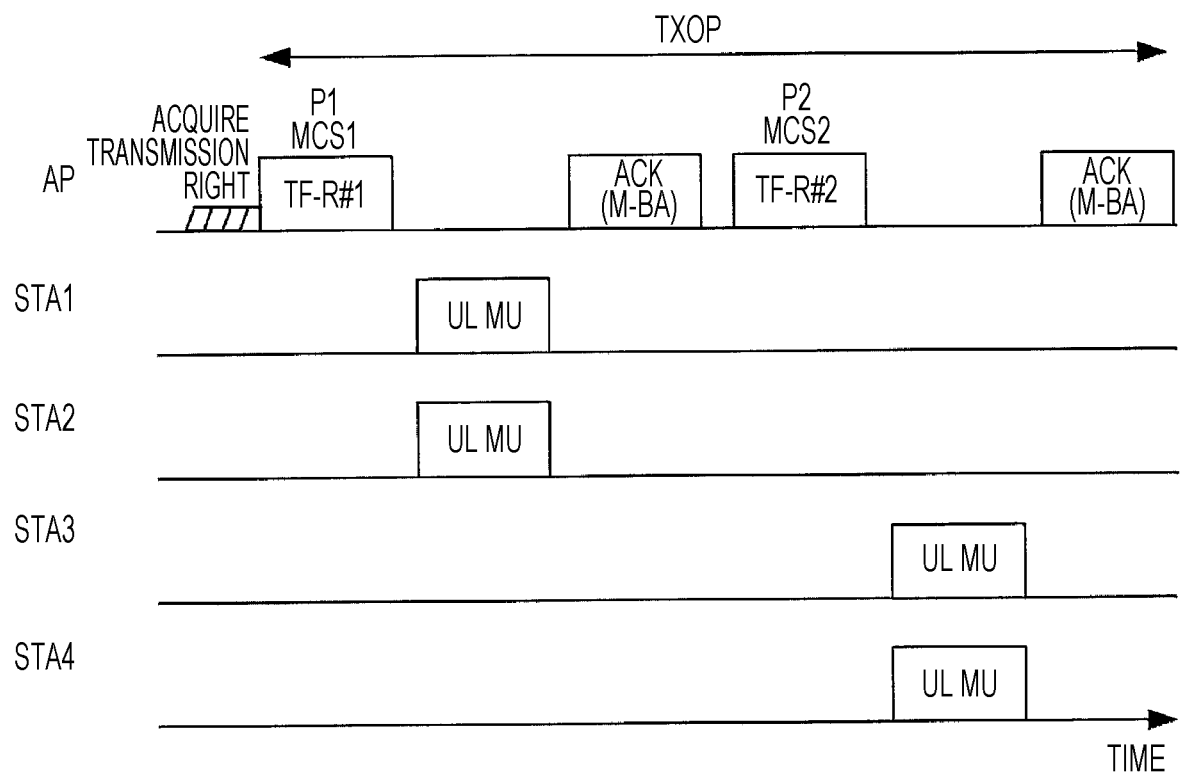
FIG. 25 is a diagram that illustrates an example of a UL MU transmission procedure in a controlling method 1 of Embodiment 3.

FIG. 25 illustrates an example of the UL MU transmission procedure for successively transmitting the random access control signals (TF-Rs) according to Embodiment 3.

In FIG. 25, in the UL MU transmission procedure within a TXOP section in the access point 400 (AP) that acquires a transmission right by the CSMA/CA, TF-R#1 is a first random access control signal to be transmitted, and TF-R#2 is a second random access control signal to be transmitted. In addition, in FIG. 25, ULMU is the UL response signal, and ACK (or multi-STA block ACK (M-BA)) is information indicating the success in receiving the UL response signal. In addition, in FIGS. 25, P1 and P2 are the target reception power values in every transmission.

Note that the successive transmission means that the random access control signals are successively transmitted in the TXOP. After acquiring the transmission right by the CSMA/CA, the access point 400 counts the number of the transmission. The access point 400 sets the target reception power value applied to the first random access control signal to be transmitted (TF-R#1) using any one of the target reception power setting methods (random access allocation) of Embodiment 1.

Hereinafter, controlling methods 1 to 3 of the transmission control unit 401 are described severally.

<Controlling Method 1>

In the controlling method 1, when successively transmitting the random access control signals, the transmission control unit 401 controls the target reception power value of the random access-allocation station to decrease the target reception power value at every transmission. In addition, in accordance with the decrease of the target reception power at every transmission of the random access control signal, the transmission control unit 401 decreases the MCS level of the response signal as well (i.e., changes to the MCS with low transmission rate). The MCS level may be uniquely set depending on the target reception power value.

For example, the transmission control unit 401 applies the target reception power setting method 1 (random access allocation) to the calculation of the target reception power value P1 provided as notification by the first random access control signal to be transmitted. Then, the transmission control unit 401 makes the target reception power value P2 provided as notification by the second random access control signal to be transmitted lower than the target reception power value P1 as the first notification by 10 dB (P2=P1−10[dB]). Preferably, this difference between the different target reception power is determined based on the value of the allowable power difference. For example, the allowable power difference may be ±5 dB, and the amount of change of the target reception power value may be 10 dB.

As described above, the transmission control unit 401 decreases the target reception power value and the MCS level at every transmission in the successive transmission of the random access control signals. That is, immediately after the UL MU-MIMO/OFDMA transmission procedure using the random access control signal in which the target reception power value P1 is designated, the access point 400 (transmission control unit 401) performs the UL MU-MIMO/OFDMA transmission procedure using the random access control signal with the designated target reception power value P2 (<P1).

As described above, even with the station 300 that could not transmit the response signal due to the limit of the maximum transmission power because of the high target reception power value in the first random access control signal, the response signal can be transmitted with the target reception power value of the decreased reception power, which is equal to or lower than the maximum transmission power of the station 300, that the second random access control signal provided as notification.

That is, the significant decrease of the transmission opportunity of the response signal of the specific station 300 such as the station 300 of the cell edge can be prevented. In addition, since the target reception power value is changed based on the value of the allowable power difference, a station having no transmission power control function also can be given the transmission opportunity.

Moreover, the controlling method 1 can be applied to the control such as suppression of access of the station 300 of the cell edge using the first random access control signal and suppression of access of the station 300 near the access point using the second random access control signal.

<Controlling Method 2>

In the controlling method 2, when successively transmitting the random access control signals, the transmission control unit 401 increases the allowable power difference at every transmission. For example, the transmission control unit 401 sets the target reception power value with the target reception power setting method 1 (random access allocation). In addition, when the first random access control signal is transmitted, the transmission control unit 401 covers the station 300 having average power with a small allowable power difference. Then, when the second random access control signal is transmitted, the transmission control unit 401 can cover the station 300 that could not transmit the response signal with the first random access control signal by increasing the allowable power difference.

As described above, when successively transmitting the random access control signals, the transmission control unit 401 increases the allowable power difference at every transmission of the random access control signals. This increases the allowable power difference of the target reception power value at every transmission, and thus, even the station 300 that could not transmit the response signal at the last transmission due to the limits of the maximum transmission power, the minimum transmission power, and the transmission power variable range can transmit the response signal at the later transmission. In other words, the response signal from the station 300 with a large difference between the target reception power value designated by the access point 400 and the target reception power value based on the transmission power that the station 300 can transmit can be made to transmit that response signal easier at every transmission.

<Controlling Method 3>

In the controlling method 3, like the controlling method 1, in the successive transmission of the random access control signals, the transmission control unit 401 decreases the target reception power value and the MCS at every transmission. Further, the transmission control unit 401 increases a PPDU length of the UL MU transmission at every transmission.

As described above, in the successive transmission of the random access control signals, decreasing the target reception power value and the MCS level at every transmission and increasing the PPDU length do not only achieve the similar effect as the controlling method 1 but also make the amount of information to be transmitted by the first UL response signal and the second UL response signal almost the same. That is, this can solve the inequality between the station 300 using the first UL response signal for the transmission and the station 300 using the second UL response signal for the transmission.

In addition, controlling to decrease the target reception power value step by step also affects improvement of the use efficiency and the delay property of the time resource as described below. Specifically, when the target reception power value is small, the station 300 having enough link budget (i.e., the station 300 having extra power against the path-loss) may also perform transmission while decreasing the transmission power. In this case, the MCS with a speed lower than the transmittable maximum speed is used, and the long transmission time is required for the same data amount. On the other hand, in this embodiment, setting the large target reception power value at first increases the possibility that the station 300 capable of high-speed transmission transmits the response signal with a high-speed MCS and a short PPDU without unnecessarily slowing down. This can improve the use efficiency and shorten the transmission delay of the time resource.

The controlling methods 1 to 3 of the transmission control unit 401 are described above.

Note that the successive transmission is not limited to be the transmission in the TXOP section where the transmission right is obtained in advance, and a section to which the random access control signals are successively transmitted (a section where a flag of the cascade field is 1) in the cascade field (also called cascaded field) included in the random access control signal may be the section for the successive transmission. In addition, the transmission control unit 401 may perform the transmission control in the same way even when the number of the successive transmission is three or more.

As described above, in this embodiment, when the random access control signals are successively transmitted, the transmission control unit 401 performs the operation to decrease the target reception power value and the MCS level at every transmission of the successive transmission. This can prevent the significant decrease of the transmission opportunity of the response signal of the specific station 300 such as the station 300 with a low capability in controlling the transmission power.

Embodiment 4

In 11ax, two types of station classes (also called STA classes) with different required accuracy such as the setting accuracy of the transmission power and the RSSI measurement accuracy are supported. A class A station is a high functional station that requires that the setting accuracy of the transmission power (absolute value) to be within ±3 dB. That is, the class A station is allowed to have a setting error of a maximum of 3 dB of the transmission power indicated by the access point. On the other hand, a class B station is a low functional station that requires that the setting accuracy of the transmission power (absolute value) to be within ±9 dB. That is, the class B station is allowed to have a setting error of a maximum of 9 dB of the transmission power indicated by the access point.

As described above, in terms of whether it is possible to set the transmission power of the station satisfying the condition that the transmission power falls within the allowable power difference based on the target reception power value, whether to stop the transmission of the signal is determined and the transmission of the response signal is stopped. This can reduce the MU interference and allow the reception signal to fall within the dynamic range of A/D conversion. Further, the system throughput can also be improved. In this embodiment, in terms of whether it is possible to set the transmission power of the station satisfying the allowance condition set based on the target reception power set by the access point, whether the transmission of the concerned signal is inhibited is determined.

Thus, in this embodiment, when it is difficult to satisfy the allowance condition due to the limits of the maximum transmission power, the minimum transmission power, and the transmission power variable range of the station, the reception power difference between the stations in the access point is reduced by inhibiting the transmission from the station.

The configuration of the station 300 is the same as that of Embodiment 2 (FIG. 22). In addition, the configuration of the access point 400 is the same as that of Embodiment 1 (FIG. 4).

Based on the target reception power value inputted from the RA control signal decoding unit 204 and the path-loss value inputted from the path-loss estimating unit 207, the transmission power calculating unit 205 calculates the transmission power value using Equation (3).

Based on the transmission power value inputted from the transmission power calculating unit 205, the information inputted from the RA control signal decoding unit 204 (such as the target reception power value), and the maximum transmission power, the minimum transmission power, and the transmission power variable range of the station 300, the transmission control unit 301 determines whether it is possible to set the transmission power satisfying the allowance condition. Then, when it is impossible to set the transmission power satisfying the allowance condition, the transmission control unit 301 generates information indicating the transmission inhibition. As described above, the transmission control unit 301 determines whether it is possible to set the transmission power value satisfying the allowance condition, and when the setting is impossible, the transmission control unit 301 outputs the information indicating the transmission inhibition to the radio transmitting-receiving unit 202. Note that details of a method of setting the allowance condition are described later.

When the information indicating the transmission inhibition is inputted from the transmission control unit 301, the radio transmitting-receiving unit 202 does not transmit the signal inputted from the transmission signal generating unit 210. On the other hand, when no information indicating the transmission inhibition is inputted from the transmission control unit 301, the radio transmitting-receiving unit 202 performs the predetermined radio transmitting processing such as D/A conversion on the signal inputted from the transmission signal generating unit 210 and up-conversion on the carrier frequency, and then transmits the radio transmission processed signal via the antenna 201.

Hereinafter, allowance condition setting methods 1 to 3 are described severally with reference to FIGS. 26A to 26C.

<Allowance Condition Setting Method 1>

Figure 26A:
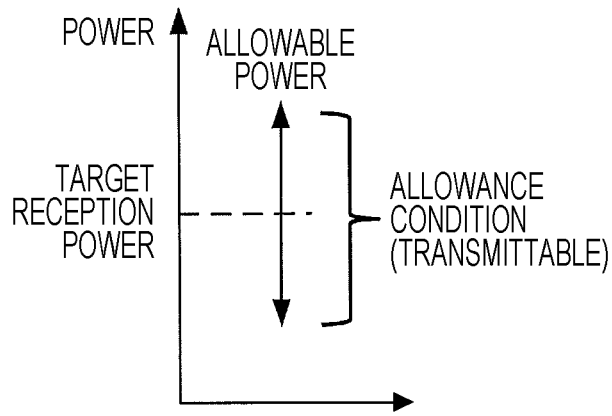
FIG. 26A is a diagram that illustrates an example of an allowance condition in an allowance condition setting method 1 of Embodiment 4.

FIG. 26A is an example of a method of setting the allowance condition in the allowance condition setting method 1. In the allowance condition setting method 1, when the station cannot transmit the response signal with the transmission power value that is calculated using Equation (3) due to the limits of the maximum transmission power, the minimum transmission power, and the transmission power variable range of the station, the reception power value in the access point in a case where the response signal is transmitted with the actually transmittable transmission power value is estimated in the station side. Then, even in a case where the station sets the maximum transmission power value as the transmission power value, the transmission from the station is inhibited if the reception power estimation value in the access point is lower than the lower limit value of the allowable power range, which is set based on the target reception power value. In addition, even in a case where the station sets the minimum transmission power value as the transmission power value, the transmission from the station is inhibited if the reception power estimation value in the access point is higher than the upper limit value of the allowable power range. Moreover, when the steps of the transmission power value settable by the station are too rough and it is impossible to set the transmission power value to allow the reception power estimation value in the access point to fall within the range of the allowable power based on the target reception power value, the transmission from the station is inhibited. In other words, when there is no transmission power value settable by the station to allow the reception power estimation value in the access point to be between the lower limit value and the upper limit value of the allowable power range, the transmission from the station is inhibited. Note that a method of setting the allowable power range is described later.

As described above, the transmission is inhibited when there is no transmission power value settable by the station to allow the reception power estimation value in the access point to be between the lower limit value and the upper limit value of the allowable power range due to the limits of the maximum transmission power, the minimum transmission power, and the transmission power variable range of the station. This prevents increase of the reception power difference in the access point, and thus the MU interference can be reduced.

<Allowance Condition Setting Method 2>

Figure 26B:
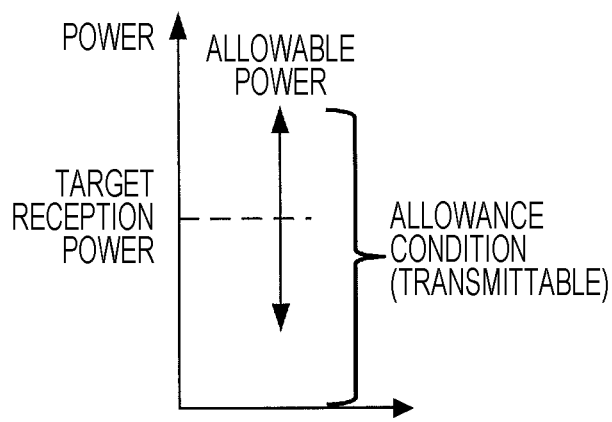
FIG. 26B is a diagram that illustrates an example of an allowance condition in an allowance condition setting method 2 of Embodiment 4.

FIG. 26B is an example of a method of setting the allowance condition in the allowance condition setting method 2. In the allowance condition setting method 2, when the station cannot transmit the response signal with the transmission power value that is calculated using Equation (3) due to the limits of the maximum transmission power, the minimum transmission power, and the transmission power variable range of the station, the reception power value in the access point in a case where the response signal is transmitted with the actually transmittable transmission power value is estimated in the station side. Then, even in a case where the station sets the minimum transmission power value as the transmission power value, the transmission from the station is inhibited if the reception power estimation value in the access point is higher than the upper limit value of the allowable power range, which is set based on the target reception power value. In addition, when the steps of the transmission power value settable by the station are too rough and it is impossible to set the transmission power value to allow the reception power estimation value in the access point to be equal to or lower than the upper limit value of the allowable power range, the transmission from the station is inhibited. In other words, when there is no transmission power value settable by the station to allow the reception power estimation value in the access point to be equal to or lower than the upper limit value of the allowable power range, the transmission from the station is inhibited.

As described above, the transmission is inhibited only when there is no transmission power value settable by the station to allow the reception power estimation value in the access point to be equal to or lower than the upper limit value of the allowable power range due to the limits of the maximum transmission power, the minimum transmission power, and the transmission power variable range of the station, and this makes it possible to inhibit the transmission of a response signal having a large effect on the interference in the reception signal of another station. That is, inhibition of the transmission of the response signal having the reception power estimation value higher than the target reception power value in the access point above a certain degree can reduce the MU interference. In addition, allowance of the transmission with a value lower than the allowable power lower limit value can prevent the decrease of the transmission opportunity of the station.

<Allowance Condition Setting Method 3>

Figure 26C:
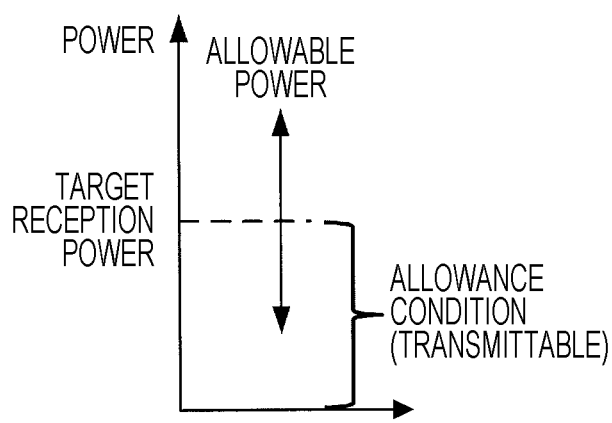
FIG. 26C is a diagram that illustrates an example of an allowance condition in an allowance condition setting method 3 of Embodiment 4.

FIG. 26C is an example of a method of setting the allowance condition in the allowance condition setting method 3. In the allowance condition setting method 3, when the station cannot transmit the response signal with the transmission power value that is calculated using Equation (3), the reception power value in the access point in a case where the response signal is transmitted with the actually transmittable transmission power value is estimated in the station side. Then, even in a case where the station sets the minimum transmission power value as the transmission power value, the transmission from the station is inhibited if the reception power estimation value in the access point exceeds the target reception power value. In addition, when the steps of the transmission power value settable by the station are too rough and it is impossible to set the transmission power value to allow the reception power estimation value in the access point to be equal to or lower than the target reception power value, the transmission from the station is inhibited. In other words, only when the reception power estimation value in the access point exceeds the target reception power value provided as notification from the access point, the transmission from the station is inhibited.

As described above, the transmission is inhibited only when the reception power estimation value in the access point exceeds the target reception power value provided as notification from the access point due to the limits of the maximum transmission power, the minimum transmission power, and the transmission power variable range of the station. This makes it possible to restrict the transmission of the response signal with stricter condition than that of the allowance condition setting method 2, and thus the MU interference can be further reduced. In addition, allowance of the transmission with a value lower than the target reception power value can further prevent the decrease of the transmission opportunity of the station.

The allowance condition setting methods 1 to 3 in this embodiment are described above.

Hereinafter, range of allowable power value setting methods 1 to 4 in the allowance condition setting methods 1 to 3 are described severally with reference to FIGS. 27A to 27D.

<Range of Allowable Power Value Setting Method 1>

Figure 27A:
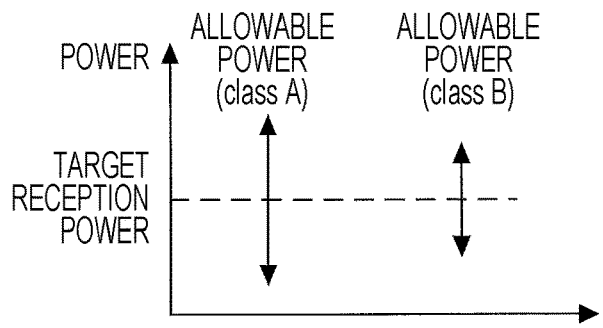
FIG. 27A is a diagram that illustrates an example of a range of an allowable power value in a range of allowable power value setting method 1 of Embodiment 4.

FIG. 27A illustrates an example of a method of setting the range of the allowable power value in the range of allowable power value setting method 1. In the range of allowable power value setting method 1, the range of the allowable power value is changed depending on the performance of the station (e.g., class A, class B). For example, the range width of the allowable power value of the class A station is made large, and the range width of the allowable power value of the class B station is made smaller than that of the class A station. This is because the setting accuracy of the transmission power of the class A station is higher than that of the class B station.

As described above, in the station having the low station performance, the power difference between the actual reception power value in the access point and the target reception power value is likely to be large because of the reception power estimation accuracy. Thus, the range width of the allowable power value is changed depending on the performance of the station and the transmission from the station having the low performance is made easily inhibited, and this can reduce the MU interference.

<Range of Allowable Power Value Setting Method 2>

Figure 27B:
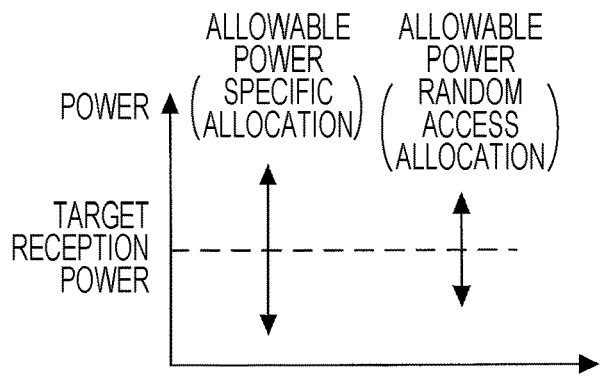
FIG. 27B is a diagram that illustrates an example of a range of an allowable power value in a range of allowable power value setting method 2 of Embodiment 4.

FIG. 27B illustrates an example of a method of setting the range of the allowable power value in the range of allowable power value setting method 2. In the range of allowable power value setting method 2, the range of the allowable power value is changed depending on the allocation: the random access allocation and the specific allocation. For example, the range of the allowable power value in the specific allocation is made large, and the range of the allowable power value in the random access allocation is made small.

In the random access allocation, since which station secures the resources from the random access is hardly determined in the access point side, the resource allocation in which the scheduler takes account of the reception power difference is impossible. Accordingly, in the random access allocation, the interference from the adjacent RU due to the reception power difference is likely to be greater than that in the specific allocation. Thus, the interference due to the reception power difference tends to occur easily. Hence, according to this setting method 2, the transmission from the random access-allocation station can be easily inhibited, and this can reduce the MU interference.

<Range of Allowable Power Value Setting Method 3>

Figure 27C:
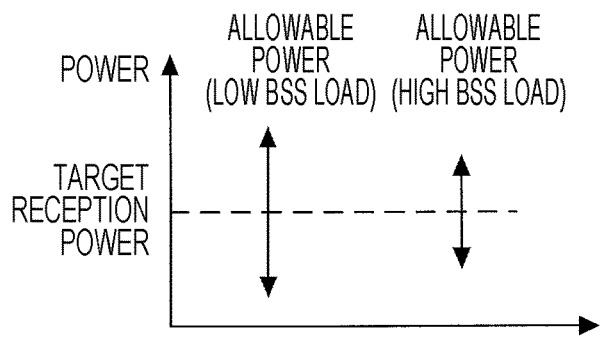
FIG. 27C is a diagram that illustrates an example of a range of an allowable power value in a range of allowable power value setting method 3 of Embodiment 4.

FIG. 27C illustrates an example of a method of setting the range of the allowable power value in the range of allowable power value setting method 3. In the range of allowable power value setting method 3, the range of the allowable power value is changed depending on the information (BSS LOAD) on the number of the stations connected to the access point and the traffic amounts. For example, the range of the allowable power value is made large when the BSS LOAD is low, or the number of the stations connected to the access point is small. Meanwhile, the range of the allowable power value is made small when the BSS LOAD is high, or the number of the stations connected to the access point is large. Note that the BSS LOAD is provided as notification by the beacon.

When the BSS LOAD is high, it can be thought that the usage of the resource is high; thus, the adjacent RU is likely to be used and the signals are likely to collide by the random access. For this, according to this setting method 3, the transmission from the station when there is high BSS LOAD is made easily inhibited, and this can reduce the MU interference.

<Range of Allowable Power Value Setting Method 4>

Figure 27D:
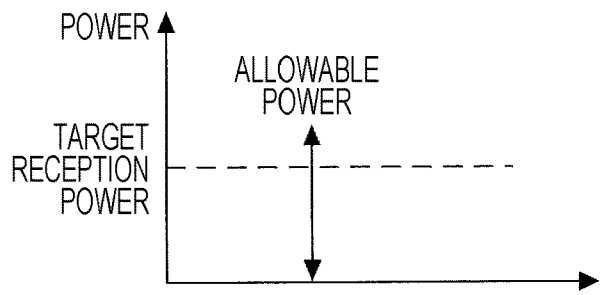
FIG. 27D is a diagram that illustrates an example of a range of an allowable power value in a range of allowable power value setting method 4 of Embodiment 4.

FIG. 27D illustrates an example of a method of setting the range of the allowable power value in the range of allowable power value setting method 4. In the range of allowable power value setting method 4, the range width of the allowable power value is different depending on whether the reception power estimation value in the access point, which is estimated based on the transmission power value that is calculated using Equation (3), is higher or lower than the target reception power value. For example, the range width of the allowable power value is made small when the reception power estimation value is higher than the target reception power value, and the range width of the allowable power value is made large when the reception power estimation value is lower than the target reception power value.

When the reception power estimation value is higher than the target reception power value, the effect of the interference in another station tends to be larger. For this, according to this setting method 4, the transmission from the station that can transmit the response signal only with the transmission power value higher than the target reception power value is made easily inhibited, and this can reduce the MU interference.

The range of allowable power value setting methods 1 to 4 in this embodiment are described above.

Note that the range of the allowable power value may be the power difference based on the target reception power value, or may be a range defined with the upper limit value and the lower limit value of the range of the allowable power value. In addition, in the above-described allowable condition setting method 2, only the upper limit value of the allowable power value may be set.

Note that a value specified in advance or a value provided as notification from the access point may be used as the range of the allowable power value.

Note that the range of allowable power value setting methods may be used in combination.

Note that the allowable condition setting method and the range of allowable power value setting method may be dynamically changed in accordance with the signaling from the access point.

As described above, in this embodiment, the transmission control unit 301 inhibits the transmission processing of the station 300 when the station 300 cannot transmit the UL response signal with the transmission power satisfying the allowance condition based on the target reception power value provided as notification from the access point 400 due to the transmission power control capability (performance) of the station 300 such as the limits of the maximum transmission power, the minimum transmission power, and the transmission power variable range of the station 300. This can reduce the reception power difference between the stations 300 in the access point 400 regardless of the limits of the performance of the station 300, or the maximum transmission power, the minimum transmission power, and the transmission power variable range of the station 300. Thus, according to this embodiment, it is possible to reduce the MU interference and improve the system throughput.

The embodiments of the present disclosure are described above.

Other Embodiments (1) In each of the above-described embodiment, the configuration is that the target reception power value is transmitted all the time with the random access control signal; however, the configuration may be that, depending on the A/D conversion performance of the access point, no transmission power control is performed, or no target reception power value is transmitted. Whether to transmit the target reception power value may be shifted depending on Trigger type.

(2) In addition, in the above described embodiments, a case where an aspect of the present disclosure is configured with hardware is described as an example; however, the present disclosure can also be implemented with software cooperating with hardware.

Moreover, in each of the above-described embodiment, a case where the random access control signal including the random access allocation is used is described; however, it is not limited thereto, and the embodiment can be applied to a case where only the specific allocation is included. In particular, the present disclosure is useful when the access point cannot appropriately evaluate the path-loss and the transmission power control capability of the station because the state or the position of the station is changed for example.

Further, in the communication method of the present disclosure, the transmission power (TRP) of the access point provided as notification from beacon, TF, and TF-R may be power in Antenna Connector including no effect of the antenna directivity or, when multiple antennae are provided, may be resultant power that is the sum of power in multiple Antenna Connectors.

Furthermore, each functional block used for describing the above-described embodiments is implemented as an LSI, which is typically an integrated circuit. The integrated circuit may control corresponding functional block used for describing the above-described embodiments and may include an input terminal and an output terminal. The integrated circuit may be individually formed as a single chip, or may be formed as a single chip so as to include a part or all of the functional blocks. The LSI here may also be referred to as an IC, a system LSI, a super LSI, or an ultra LSI depending on a difference in the degree of integration.

In addition, the technique of implementing an integrated circuit is not limited to the LSI and may be implemented by using a dedicated circuit or a general-purpose processor. A FPGA (Field Programmable Gate Array) that can be programmed after the manufacture of the LSI or a reconfigurable processor in which the connections and the settings of circuit cells disposed inside the LSI can be reconfigured may be used.

Moreover, if future integrated circuit technology replaces LSIs as a result of the advancement of semiconductor technology or other derivative technology, the functional blocks could be integrated using the future integrated circuit technology. Biotechnology can also be applied.

A communication apparatus of the present disclosure includes: a target reception power setting unit that sets at least one target reception power value as UL transmission power control information for controlling upstream transmission power of each of multiple stations, the target reception power value being a target value of reception power when an upstream signal is received from each of the multiple stations; a signal generating unit that generates a random access control signal including the at least one target reception power value; and a transmitting unit that transmits the random access control signal.

In the communication apparatus of the present disclosure, the random access control signal includes a common field for providing control information common to the plurality of stations as notification and a station-specific field for providing control information specific to each of the plurality of stations as notification, and the signal generating unit arranges the target reception power value in the station-specific field of the random access control signal.

In the communication apparatus of the present disclosure, the random access control signal includes a common field for providing control information common to the multiple stations as notification and a station-specific field for providing control information specific to each of the multiple stations as notification, and the signal generating unit arranges the target reception power value in the common field of the random access control signal.

In the communication apparatus of the present disclosure, the target reception power value is set to a different value depending on a type of information transmitted by the random access.

In the communication apparatus of the present disclosure, the target reception power value is provided as notification in every specific allocation and random access allocation.

In the communication apparatus of the present disclosure, the signal generating unit arranges the target reception power value in the common field of the random access control signal and arranges an offset value from the target reception power value in the station-specific field of the random access control signal.

In the communication apparatus of the present disclosure, the signal generating unit arranges the target reception power value in the station-specific field for a random access-allocation station and arranges a transmission power value for transmitting the upstream signal in the station-specific field for a specific-allocation station.

In the communication apparatus of the present disclosure, the signal generating unit arranges the target reception power value in the common field for a random access-allocation station and arranges the target reception power value in the station-specific field for a specific-allocation station.

In the communication apparatus of the present disclosure, a transmission control unit that controls the target reception power value included in the random access control signal when successive random access control signals are transmitted is further included.

In the communication apparatus of the present disclosure, the target reception power setting unit sets a first target reception power value and a second target reception power value, and the transmission control unit performs UL MU-MIMO/OFDMA transmission procedure using the random access control signal designating the first target reception power value and, immediately thereafter, performs UL MU-MIMO/OFDMA transmission procedure using the random access control signal designating the second target reception power value.

In the communication apparatus of the present disclosure, the transmission control unit sets the second target reception power value to a value smaller than the first target reception power value.

A communication method of the present disclosure includes: setting at least one target reception power value as UL transmission power control information for controlling upstream transmission power of each of multiple stations, the target reception power value being a target value of reception power when an upstream signal is received from each of the multiple stations; generating a random access control signal including the at least one target reception power value; and transmitting the random access control signal.

In the communication method of the present disclosure, the random access control signal includes a common field for providing control information common to the multiple stations as notification and a station-specific field for providing control information specific to each of the multiple stations as notification, and the target reception power value is arranged in the station-specific field of the random access control signal.

In the communication method of the present disclosure, the random access control signal includes a common field for providing control information common to the multiple stations as notification and a station-specific field for providing control information specific to each of the multiple stations as notification, and the target reception power value is arranged in the common field of the random access control signal.

In the communication method of the present disclosure, the target reception power value is set to a different value depending on a type of information transmitted by the random access.

In the communication method of the present disclosure, the target reception power value is provided as notification in every specific allocation and random access allocation.

In the communication method of the present disclosure, the target reception power value is arranged in the common field of the random access control signal, and an offset value from the target reception power value is arranged in the station-specific field of the random access control signal.

In the communication method of the present disclosure, the target reception power value for the random access-allocation station is arranged in the station-specific field, and a transmission power value for transmitting the upstream signal for the specific-allocation station is arranged in the station-specific field.

In the communication method of the present disclosure, the target reception power value for the random access-allocation station is arranged in the common field, and the target reception power value for the specific-allocation station is arranged in the station-specific field.

In the communication method of the present disclosure, the target reception power value included in the random access control signal is controlled when successive random access control signals are transmitted.

In the communication method of the present disclosure, a first target reception power value and a second target reception power value are set, and UL MU-MIMO/OFDMA transmission procedure using the random access control signal designating the first target reception power value is performed, and, immediately thereafter, UL MU-MIMO/OFDMA transmission procedure using the random access control signal designating the second target reception power value is performed.

In the communication method of the present disclosure, the second target reception power value is set to a value smaller than the first target reception power value.

An aspect of the present disclosure is useful in UL MU-MIMO/OFDMA for solving carrier interference and a problem of the dynamic range of A/D conversion by reducing a reception power difference between stations.

The invention claimed is:

1. A terminal station, comprising:
   a receiver, which, in operation, receives a control signal including common information for one or more terminal stations including the terminal station and user information for each of the one or more terminal stations, wherein
      the control signal is a trigger frame that solicits transmission of an uplink (UL) response frame from each of the one or more terminal stations, and the user information includes a target reception power value for the UL response frame transmitted from each of the one or more terminal stations; and a transmitter, which, in operation, transmits the UL response frame based on the target reception power value.

2. The terminal station according to claim 1, wherein the user information includes the target reception power value that is individual for each of the one or more terminal stations, and the target reception power value is used to control transmission power of the UL response frame from each of the one or more terminal stations.

3. The terminal station according to claim 2, wherein the control signal includes transmission prohibition information for instructing to each of the one or more terminal stations that the transmission of the UL response frame is not permitted when transmission power of the UL response frame cannot be set within a permissible power range for each of the one or more terminal stations.

4. The terminal station according to claim 1, wherein the control signal includes a common field and one or more user information fields, the common field includes the common information for the one or more terminal stations, and the one or more user information fields respectively include the user information for the one or more terminal stations.

5. The terminal station according to claim 1, wherein the user information includes an ID of each of the one or more terminal stations, and the target reception power value is associated with the ID.

6. The terminal station according to claim 1, wherein the target reception power value is indicated by an offset value to be added to a determined value.

7. The terminal station according to claim 1, wherein the control signal is a random access control signal.

8. The terminal station according to claim 1, wherein the control signal is a random access control signal, and the target reception power value included in the random access control signal is controlled when the random access control signal is continuously transmitted.

9. The terminal station according to claim 8, wherein a first target reception power value and a second target reception power value are set, and UL MU-MIMO/OFDMA transmission using the random access control signal that includes the second target reception power value as the target reception power value takes place after UL MU-MIMO/OFDMA transmission using the random access control signal that includes the first target reception power value as the target reception power value.

10. The terminal station according to claim 9, wherein the second target reception power value is smaller than the first target reception power value.

11. The terminal station according to claim 1, wherein the user information includes allocation information of a resource unit for each of the one or more terminal stations.

12. The terminal station according to claim 11, wherein the user information includes an ID of each of the one or more terminal stations, and the ID indicates which terminal station the resource unit is allocated to.

13. The terminal station according to claim 11, wherein the user information includes an ID of each of the one or more terminal stations, and the ID indicates that the resource unit is allocated for random access.

14. The terminal station according to claim 13, wherein the ID indicates that the resource unit is allocated for random access by the one or more terminal stations.

15. The terminal station according to claim 1, comprising:
circuitry, which, in operation, determines UL transmit power, wherein
the transmitter, in operation, transmits the UL response frame based on the UL transmit power.

16. A communication method implemented by a terminal station, comprising:
receiving a control signal including common information for one or more terminal stations including the terminal station and user information for each of the one or more terminal stations, wherein
the control signal is a trigger frame that solicits transmission of an uplink (UL) response frame from each of the one or more terminal stations, and
the user information includes a target reception power value for the UL response frame transmitted from each of the one or more terminal stations; and
transmitting the UL response frame based on the target reception power value.

17. The communication method according to claim 16, wherein the user information includes allocation information of a resource unit for each of the one or more terminal stations.

18. The communication method according to claim 17, wherein the user information includes an ID of each of the one or more terminal stations, and the ID indicates which terminal station the resource unit is allocated to.

19. The communication method according to claim 17, wherein the user information includes an ID of each of the one or more terminal stations, and the ID indicates that the resource unit is allocated for random access by the one or more terminal stations.

20. The communication method according to claim 16, comprising:
determining UL transmit power; and
transmitting the UL response frame based on the UL transmit power.

* * * * *